United States Patent [19]

Nikiforakis

[11] 4,375,150
[45] Mar. 1, 1983

[54] CONTINUOUS IGNITION TURBO MOTOR

[76] Inventor: Paraskeyas Nikiforakis, Moustoxidi and II Therianou Sts., Athens, Greece

[21] Appl. No.: 162,427

[22] Filed: Jun. 24, 1980

[30] Foreign Application Priority Data

Sep. 5, 1979 [GR] Greece .................................... 63440

[51] Int. Cl.³ .............................................. F02C 3/14
[52] U.S. Cl. .................................. 60/39.34; 60/39.39
[58] Field of Search .................. 60/39.34, 39.35, 39.38, 60/39.39, 39.44, 39.45, 39.76, 39.78

[56] References Cited

U.S. PATENT DOCUMENTS

| 1,395,995 | 11/1921 | George | 60/39.39 |
| 2,612,022 | 9/1952 | Keys | 60/39.35 |
| 3,417,564 | 12/1968 | Call | 60/39.34 |
| 3,494,127 | 2/1970 | Brille | 60/39.39 |
| 4,241,576 | 12/1980 | Gertz | 60/39.78 |

Primary Examiner—Louis J. Casaregola
Attorney, Agent, or Firm—Edmund M. Jaskiewicz

[57] ABSTRACT

An internal combustion engine, which is particularly adapted for vertical take-off and landing aircraft, has a plurality of fixed annularly arranged combustion chambers and an opening in each chamber. The chamber openings are arranged to define either a cylindrical surface or a plane surface. The combustion chambers are arranged in groups and the groups may be staggered either radially or axially with respect to each other. A rotatable distributor has a surface conforming to the surface defined by the chamber openings and closely spaced from these openings. The distributor has a plurality of slots and recesses therein arranged in zones so as to coregister with the combustion chamber openings. Upon relative rotation of the combustion chambers and the distributor, heated and pressurized combustion gases are transmitted from one chamber to a succeeding chamber to provide for continuous ignition of a fuel-air mixture periodically introduced in the chambers while products of combustion are exhausting from the other chambers. As a modification, the distributor may be fixed and the combustion chambers rotatable.

7 Claims, 24 Drawing Figures

CONTINUOUS IGNITION TURBO MOTOR

The present invention relates to internal combustion engines, more particularly, to a rotary constant volume engine having a continuously transmitted ignition flame.

DIFFERENCE BETWEEN KNOWN MOTORS AND THE DISCLOSED MOTOR

The engine of this invention does not belong to any known category or classification of motors. It does not belong to piston motors, reciprocating motors or turbojets with the known equal compressed combustion. It belongs neither to those ramjets nor pulse-jets where the combustion can be considered of constant volume. And, finally, it does not belong to any type of rocket motors.

This motor is an internal combustion engine which does not contain reciprocating pistons, but is smoothly rotated about a shaft (like a turbine) and the combustion of the compressed mixture of air-fuel takes place within modulated chambers (stationary or rotating) under constant volume and not under constant pressure.

Air compression does not occur within stationary or rotating combustion chambers and it is not initiated from the relative rotation of the movable and stationary components of the motor which, however, could possibly produce air compression because of their proper modulation (as to a known kind or motor). Compressed air enters into the combustion chambers (or within a special type of motor with very high speed), while the setting and the construction of the rotating part of the motor is symmetrical.

The successive discharge and charging of the combustion chambers with new cold mixtures of air-fuel, which resembles the working cycle of the piston motors, results in sufficient cooling so that high temperatures of combustion can be permitted. On the other hand, the increasing high pressure of the combustion gases (because of the constant volume combustion), in combination with the non-existence of valves which could throttle the pressure of the air inlet within the combustion chambers, permits the decrease of pressure of the entering air, i.e. decreases to a minimum the weight of the compression system which also means a decrease in the total weight of the motor.

One more significant difference of this new motor with respect to the known motors, resides in the successive ignitions of the mixture of air-fuel, which take place within the combustion chambers. These ignitions must take place by the successive transmission of the flame from the one chamber to the other, during operation, and not by spark plugs nor with other known devices using hot components. The ignition could be described as a race by stages of the flame. That is, one chamber gives the flame to the other, this one to the next one, etc., thus having an endless rotation of the ignition flame as long as the motor operates. Because of this novel ignition, this motor can be called a "motor of transmitted flame".

This system of ignition, in combination with other features, provides new advantages of the motor, as follows:

(a) Because of the high temperature of the flame (overheated combustion gases) and the simultaneous compression by this flame for the combustion of a new mixture of air-fuel, even the least flammable fuels and even solid fuels in powder or slurry condition, can be burned.

(b) This ignition decreases the ignition delay of particular fuels, so that a large number of successive ignitions may be achieved per unit of time, i.e. big power concentration per unit of volume or weight of the motor.

(c) The ignition of the new mixture of air-fuel, by intercommunication of the combustion chambers, absorbs abrupt increases of pressure, i.e. it does not permit creation of impact forces which, although there are not pistons, could strain the material of the combustion chambers, because of the nature of the constant volume combustion. This absence of explosions provides the possibility of combustion of any liquid or gaseous fuels, including hydrogen, without special adjustments.

(d) Because of the permitted high temperatures of combustion (due to the periodic cooling of the chambers) the resulting ignition flame has large thermal power so that safe combustion is possible on one hand and, on the other hand, safe fluctuation between wide ranges of the quantity of air and fuel is permissible.

It is therefore the principal object of the present invention to provide a novel and improved internal combustion engine.

It is another object of the present invention to provide a constant volume rotary internal combustion engine having continuous ignition which is transmitted to successive combustion chambers during the operation of the engine.

It is a further object of the present invention to provide such a rotary internal combustion engine which can operate on a wide variety of fuels including those having relatively poor flammable properties and low-grade fuels.

It is an additional object of the present invention to provide such an internal combustion engine which is particularly suited for powering vertical take-off aircraft and other types of aircraft which do not require runways.

It is still another object of the present invention to provide an engine which can be used as a burner or for some other special chemical reactions.

According to one aspect of the present invention an internal combustion engine or motor may comprise a plurality of annularly arranged combustion chambers. Each combustion chamber has an opening and these openings are so located to define either a cylindrical surface or a plane surface. The combustion chambers are arranged in a number of groups and these groups are in staggered relationship to each other. The groups may be staggered radially or axially depending upon whether the chamber openings define a plane surface or a cylindrical surface. Means are provided for supplying a fuel-air mixture to the combustion chambers. A rotatable distributor has a surface conforming to the surface defined by the chamber openings and is closely spaced from these openings. The distributor has a plurality of slots and recesses therein which coregister with the combustion chamber openings so that upon relative rotation between the combustion chambers and the distributor heated and pressurized combustion gases are transmitted from one chamber to the next succeeding chamber to provide continuous ignition of the fuel-air mixture within the chambers while at the same time at other locations of the distributor products of the combustion are exhausted from the chamber.

The motor of this invention has application in many different fields because of its new properties. Its principal applications include but are not limited to the following:

(a) Large industrial furnaces, boilers for generation of electrical energy, rotary kilns, etc., where the advantage is that, instead of using carbon of high quality, it can burn any other solid fuel of low grade or even waste products in powder of pulp condition. The combustion will be always complete and the temperatures of the gases can be as high as it is desired. In other cases, the excessive ash can be easily isolated before its arrival upon the heated surfaces, because of its expulsion with the combustion gases.

(c) Because of the possibility of very high temperature development, it can be applied on chemical-mining industries, for oxide reduction, splitting of chemical compounds, etc., where gaseous, liquid or solid fuels can be used instead of electrical energy.

(c) With this kind of motor, conversion of low-grade fuels into a mixture of gaseous fuels, is easily possible. The utilization of air enriched with oxygen can provide gas-coal with abundant calorific force and CO and $H_2$. The engine is advantageous because it uses any fuel of low grade, waste paper, wood, plastic materials, etc., which cannot be used anywhere else. With this method of operation the motor can give coal-gas in a simple more hygienic and technically advantageous solution, if coal is used instead of poor deposits.

(d) The application of this motor on known land and water vehicles not only has the possibility of the utilization of any fuel (hydrogen, its compounds, even non-carbons), but also the advantages of large concentration of power, economic construction and maintenance.

(e) While all the existing kinds of motors have presented serious problems in their application on aircraft of vertical taking-off (V TOL), the motor of this invention is particularly suited for this purpose. Although one or more motors of this kind can be used for the movement of any kind of aircraft, their application is better on disk-shaped hulls, where, only one motor of this kind occuppies almost the whole diameter of the disk. Many kinds of disk shaped hulls have been tried up today, using combinations of known motors. However, in this case, this kind of hull is not optional but a requirement. The magnitude (diameter) of the hull can be very big or very small. The simplicity of the construction, decrease of the weight of the motion control and security mechanisms, and economization will probably lead to a solution to air travel of future, without runways.

Other objects and advantages of the present invention will be apparent upon reference to the accompanying description when taken in conjunction with the following drawings, which are exemplary, wherein.

Proceeding next to the drawings wherein like reference symbols indicate the same parts throughout the various views a specific embodiment and modifications of the present invention will be described in detail.

GENERAL DESCRIPTION OF THE MOTOR

Figure 1:
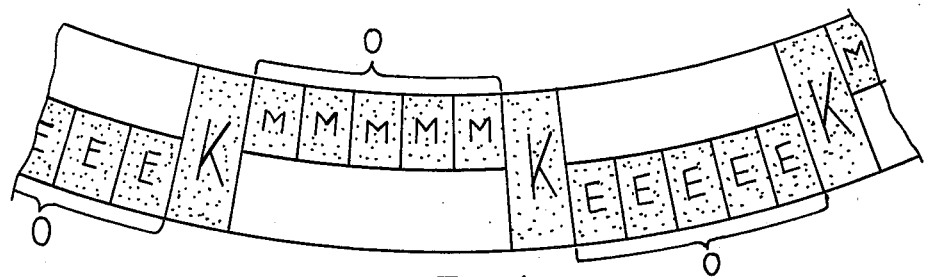
FIG. 1 is a schematic plan view of a portion of the combustion chambers of the engine according to the present invention.

The motor of this invention essentially comprises a movable or rotating part and a stationary or fixed part.

On one part are the combustion chambers and the other parts, a distributor, adjusts the entire operation of the chambers. These two parts (chambers and distributor), which are in constant rotating movement with respect to each other, are set the one exactly opposite to the other with a very short distance between them. Their geometrical arrangement in space, is like a circular ring within another one of longer diameter in some cases, or, in other cases, it is like a circular ring opposite to another one of the same diameter circular disk. These two basic types of the motor will be described below:

According to the particular application of the motor, the motor chambers within which the constant volume combustion of the mixture air-fuel takes place, can be set on the fixed or rotating part of the motor (while, correspondingly, the distributor is set on the other of the fixed or the rotating part of the motor). A similar variation occurred in the radial piston motor where in some aircraft the motor cylinders were rotating while in others they were stationary.

Something similar is present in the motor at least where it concerns vertical take-off aircraft in which it is preferable to set the combustion chambers on the rotating part. In the case of the piston motor, this inversion did not bring any changes in the motor operator. However, in this case of the present motor, different prerequisites and operation results are created, depending on whether the chambers are fixed or rotating. However, the two basic parts of the motor, i.e. chambers and distributor should first be described.

Chambers—Their shape is not cylindrical as it is in piston motors but it is a shape which better serves their construction and cooling. The chambers can be imagined like sections (slices) of a circular ring. They are set in full succession the one after the other and occupy all the circumference of a circular ring. In one very simple construction, they can occupy just a part of the circular ring.

There are three different kinds of chambers on each one motor. This difference of the chambers can be called by three different names, i.e. "inside" chambers, "outside" chambers and "relation" chambers. That is, while in a certain embodiment of the motor these names have a real meaning because they characterize the different diameters on which the "inside" and "outside" chambers are arranged. In another modification of the motor they have no meaning because all the chambers are set on the same diameter. In this second case, it is better to call them "up" and "down" chambers and "relation" chambers. Finally, in a third case which, however, is not intended for application on motors of propulsion, the three kinds of chambers are not distinguished from their different setting in space, but from the different setting of their intercommunication ports.

Generally, on each motor circumference there is a definite number of "inside" chambers which is followed by the same number of "outside" chambers, so as to complete a circle. In some motors, there are not only two rows of chambers but a part multiple of them, and with always alternately setting, i.e. "inside"-"outside"-"inside"-"outside" etc.

The number of the chambers of each one row (e.g. 10) and the multitude of the rows (e.g. 4) depend upon the circumference diameter on which they are set, the number of the motor rotations, the kind of fuel and the intended purpose of the motor application. The third kind of the chambers, i.e. "relation" chambers, are set at the end on each row and at the beginning of the next one. Their multitude in the same with the multitude of the rows. That is, they are single chambers which geometrically belong to both the two different kinds of rows ("inside" and "outside") which connect them. In other words, each one of the "relation" chambers is simultaneously "inside" and "outside" chamber or "up" and "down" chambers, etc.

The basis for the existance of the two main kinds of chambers, i.e. "inside" and "outside" or "up" and "down" etc. is that each one of these kinds of chambers has its own area (zone) of distributor from which the entire operation of its chambers is controlled. Because of the successive setting of the two rows (kinds of chambers) the distributor parts which serve one kind of chambers, find empty spaces of cooling which permit them to avoid their overheating and destruction because of their periodically direct contact with overheated combustion gases. The reason for the existence of the "relation" chambers is that the "relation" chambers are indispensable for the ignition with the method of the transmitted flame. That is, they are the chambers which permit the transmission of the flame from the "inside" chambers to the "outside" chambers, and inversely. This method of the ignition supplies the biggest advantages of the present motor.

Distributor—This is the fixed or rotating metallic surface with many formations and variations along its length, which controls the operation of the motor's combustion chambers. The distributor is cylindrical or disk shaped, according to the type of the motor. In the case of the rotating distributor, there is complete geometrical symmetry so that there are no problems of its balance. The parts of the distributor's surfaces are located at a very short distance from the lips (openings) of the combustion chambers, relatively rotating toward it. This very small distance is sufficient for the tightness of the combustion chambers, also taking into consideration their very high speed of the successive phases.

The principal purposes of the distributor are the following:

(1) The distributor surfaces closes the opening of a chamber as the compressed air is conducted within it. In some structures too, the distributor modulation is such as to permit the filling of the combustion chambers with new air.

(2) The distributor permits the fuel expulsion within the combustion chambers during its successive courses (because of the relative rotation of the chambers-distributor) through an opening.

(3) There is a hollow or slot in the distributor surface which, immediately afterwards, permits the intercommunication of a chamber with its previous chamber within which the combustion of the mixture air-fuel has taken place. As long as this intercommunication lasts, the distributor surface keeps both the chambers closed. So, through the distributor's slot the combustion flame (combustion gases of high pressure) is transmitted within the said combustion chamber, where combustion of the mixture air-fuel also takes place.

(4) The distributor, keeping closed the chamber within which there is high pressure of the combustion gases, because of the combustion, intercommunicates it with the immediately successive one combustion chamber through the same slot so that the flame continues its course to all the chambers.

(5) After the phase of the flame transmission from the said chamber, the distributor opens gradually its opening. During this opening, the high pressure of the combustion gases within the said chamber performs its task. This can be done on three ways. Firstly, through blades of the rotating distributor (action). Secondly, through blades and proper inclination toward the openings of the chambers (reaction). Thirdly, with further pressure expulsion of the combustion gases toward fixed nozzles (reaction again). This third case concerns mainly propelling motors where, as it will be described in detail below, distributor and nozzles are the fixed parts while combustion chambers are the rotating parts.

(6) After the pressure expansion of the combustion gases and the performance of the task, the distributor permits evacuation, and the new air which is coming into the combustion chambers, is permitted to escape with the combustion gases as to producing good rinsing and cooling of the combustion chambers.

(7) Finally, the distributor surface closes again the opening of the said combustion chamber for a new filling with air under pressure, so that the same phases of operation will take place again.

THERMAL AND MECHANICAL STRESSES ON THE MOTOR

Thermal stresses—There are three parts of the motor which are subjected to the high temperatures of the combustion gases. These parts are combustion chambers, distributor and propelling nozzles (when used). The periodic operation of the combustion chambers, during which the entering new cold air cools directly their interior surfaces, permits very high temperatures of combustion, without dangers of overheating. Something similar happens to the piston motors but, in our case, the cooling is much stronger and more effective, because:

(1) The quantity of air which comes within the chamber and cools it, is not limited by the chamber volume (because of suction), nor by the narrow ports with the short duration of opening. One can selectively permit such a quantity of air to pass through the chamber, before its opening is closed from the distributor, as to have sufficient interior cooling.

(2) The chamber walls are constructed with iron plates of relatively small thickness, so that even the exterior cooling of the chambers is sufficient without encumbering the engine with circuits of cooling liquid circulation, etc. In the case of the rotating chambers (which concerns the application on aircraft of vertical take-off) the chambers' rotation itself secures their perfect exterior cooling.

(3) Finally, the elimination of pistons, plates and lubricants within the chambers of the described motor, enables acceptance of higher mediate temperatures of operation.

With respect to the distributor, there is excellent cooling because of its periodic operation, as mentioned above. The periodicity is succeeded with the existence of the two kinds of chambers, i.e. "inside" and "outside" or "up" and "down" and the corresponding modulation of the distributor. That is, there are two zones of operation in the distributor of which one corresponds to the "inside" or "up" chambers and the other one to the "outside" or "down" chambers. In these two zones, there are all the surfaces and structures which secure the above-described working cycle of each one chamber. That is, there are surfaces which close the opening of the chambers (for their filling with compressed air), slots or hollows on these same surface (which permit the intercommunication of the chambers for the transmission of the ignition flame), blades or nozzles for utilizing the combustion gases expansion and, finally, there are the distributor areas which permit rinsing the chambers from the combustion gases.

All round the circumference of the distributor which has a cylindrical or cyclical shape, all the above components are in double and on the same radius, so as to have two similar zones, i.e. "inside" and "outside" or "up" and "down". Each one zone operates when the corresponding chambers are exactly opposite it and, consequently, undergoes the assault of the overheated combustion gases. That is, the "inside" zone of the distributor operates when the "inside" chambers are opposite it and the "outside" zone operates when the "outside" chambers are opposite it.

Because of the setting of the chambers rows by turns, which form a zig-zag on the circumference ("inside"-"outside"-"inside"-"outside", etc.), at the places where the "inside" chambers are, the distributor's "outside" zone neither operates nor has an obstacle in front of it so it can be cooled directly at whatever degree desired. Correspondingly, at those places where the "outside" chambers are, the distributor's "inside" zone is completely clear so that it is possible to follow its sufficient cooling with strong currents of air from the motor itself. The distributor surfaces, hollows, blades or nozzles, etc., are able to withstand the assaults of the overheated combustion gases, with which they come in direct touch only because of this periodic direct cooling.

The periodicity of the distributor heating and cooling can be different from that of the combustion chambers as described below. All of the above surfaces and components of the distributor which are necessary for the completion of a working cycle can be termed a "unit". One "unit" can occupy all of the distributor circumference or only a part of it. In other words, there can be only one "unit" and many of them on the distributor circumference. When there are many "units", there then exists a multiple number of working cycles of each combustion chamber at each one (relative) rotation of the distributor.

Consider n the number of the motor rotations per unit of time, Z the multiple of the row pairs of the combustion chambers, M the number of the distributor "units", as above. At each rotation of the motor there will be M reiterations, i.e. working cycles to each one combustion chamber. There will also be Z successive heatings and coolings of the distributor surfaces which are assaulted by the overheated combustion gases. So the operation period of the combustion chambers will be $t=1/n.M$ while the heating-cooling period of the distributor will be $T=1/n.Z$. This differentation of the heating and cooling periods permits the proper selection for sufficient cooling of both of them, as it concerns combustion chambers and distributor.

Finally, as it concerns the propelling nozzles of the motor (when present) it must be noticed that with respect to thermal stresses they suffer less than the nozzles of the known turbojets. This is because of the periodicity of their assault by the combustion gases on the one hand and, on the other hand because of their intermediate cooling by the same current of air which cools the distributor, as described above.

Mechanical stresses—The centrifugal forces to which the rotating part is subjected and the pressures which act on the chambers and distributor because of the combustions can be easily tolerated with proper sections and reinforcement of metals. Something which might cause problems is the repeated impacts of combustion since these combustions take place under constant volume they could provoke abrupt increases of the pressure (explosions) with the result to strain and destroy many parts of the motor over a period of time. These impacts of the combustions can be avoided with the ignition and combustion, which is exclusive for this motor, i.e. with the method of the transmitted flame. For the application of this method there are slots or hollows (as above) on the distributor surface on the one hand and, on the other hand the third kind of the chambers, i.e. "relation" chambers. The slots which are on the distributor surface permit the transmission of the flame from each one chamber to the next one. The "relation" chambers permit the flame transmission from the "inside" chambers to the "outside" chambers and inversely. The two kinds of the chambers are necessary for the disclosed motor for proper cooling of the distributor.

If the ignition of the mixture air-fuel was to be made, e.g. with spark plugs and not with the method of the transmitted flame, it is apparent that the "relation" chambers would not be necessary. The "relation" chambers are set in such a way as to be located at the end of each one row of chambers and at the beginning of the next one. They are also extended geometrically so as to belong simultaneously to both of the kinds, i.e. they are "inside" and "outside" or "up" and "down". This setting serves exactly this relay of the flame and its transmission from the "inside" chambers to the "outside" chambers (and inversely). The flame transmission through the distributor slots from each one chamber to the other creates certain phenomena.

Let us consider any chamber v at the moment that the combustion of the mixture air-fuel is completed. The distributor, through its slot, immediately intercommunicates the chamber v with its immediate next one chamber v+1, where the combustion has not yet started. Because of the high pressure (result of the constant volume combustion) within the chamber v and the low pressure of the air within the chamber v+1, the overheated gases rush from the chamber v to the chamber v+1 through the distributor slot. This rushing of gases partially expands the pressure of the chamber v (where the explosive increase of the pressure is not desired) on the one hand and, on the other hand heats, whirls and compresses strongly the mixture air-fuel of the chamber v+1 so that the combustion also starts within it. The combustion within the chamber v+1 cannot instantaneously be converted into an explosion because there is the possibility of retrogression of the pressure within the chamber v which absorbs and smoothes out the abrupt increases of the pressure. But even the continuation of the combustion within the chamber v+1 cannot be converted into explosion because of the direct intercommunication of the chamber v+1 with its next chamber v+2, where we have transmission of the flame, as above, i.e. partial expansion of the pressure of the chamber v+1.

This process of ignition-combustion has the following results:

(1) Because of the partial explosion and retrogression of the pressures from each one chamber not only to the next one but to its previous one too, there will be smoothing out of the combustions and putting out of the eventual abrupt increases of the pressure so that there will be no impact stresses on the motor on the one hand and, on the other hand, the fuels that would be explosive in other cases of constant volume combustions, can possibly be burned.

(2) Because of the strong turbulence and the high temperature of the combustion gases which constitute the transmitted flame, it is not necessary to have dispersion of the fuel within the combustion chambers with high pressure and specific injectors. The fuel is continuously fed to the intercommunication slots of the distributor with simple piping and under low pressure where it is induced by the entering combustion gases and dispersed within the combustion chambers in order to be burned. Because of this supply apparatus solid fuels in powder or pulp condition can be easily burned.

(3) With the method of the transmitted flame, the combustion is safe even when large fluctuations are created in the air or fuel quantity.

(4) Because of the very large thermal power of the ignition flame, the turbulence and the simultaneous compression by it of the mixture air-fuel which is going to be combusted, there is a decrease of the ignition delay and rapid ignition of the fuel and, consequently, a possibility of increase of the motor rotations, i.e. big power concentration in constant volume or weight of motor.

(5) If spark plugs or other thermal components are used for ignition instead of intercommunication of the chambers and flame transmission, there will not be sufficient results for the periodic ignition of the mixture air-fuel, because:

(a) As air compression is low, the mixture air-fuel will be relatively cool within the combustion chambers. There will then be a big delay of ignition and low speed of combustion, i.e. few repetitions of combustion within each one chamber per unit of time, which means a small concentration of motor power.

(b) The required power for the spark plugs must be very high.

(c) As far as there is no intercommunication of the chambers through the distributor slot, (i.e. transmission of the flame) there will be abrupt increase of the pressure, i.e. the combustion will be unacceptably percussive.

In combination with the ignition by the transmitted flame, there will be a spark plug too (one to each "unit" of the distributor). This is because the first flame must be produced for starting the motor and for security reasons (where there are such reasons). These spark plugs are exactly the same with these which are used in oil burners. They are located near to the intercommunication slot of the motor, and they operate in order to create the first flame, while the motor is slowly rotated by some kind of starter. After its first appearance, the flame is preserved and transmitted, because of the successive combustions within the chambers without the necessity of spark plug operation. However, on those motors which require greater security (like aircraft) flashes of spark plugs can possibly take place from time to time so that an accidental case of extinction of the flame, the flame is automatically created again. There are no problems of overheating of the spark plugs because they are periodically cooled with the whole distributor.

The starting spark plug is preferably installed on the stationary combustion chambers, in the cases of the rotating distributor. Only one spark plug is sufficient and it is set in any combustion chamber. A short duration of its operation is sufficient to find the chamber closed and filled with air and fuel so that the first flame can be created. Afterwards, during the slow starting of the motor, the flame is transmitted by itself to all the chambers and it is rotated incessantly as long as the motor operates.

AIR COMPRESSION AND EXPULSION OF COMBUSTION GASES

Depending upon the type of the disclosed motor and its particular application, these two phases of operation have many variations. For example, in an industrial application of the motor, for the production of gaseous fuel or for the splitting of a chemical compound, it is logical not to be occupied too much with the above phases. However, in the application of the above motor on an aircraft of vertical take-off these two phases have a big role. Firstly, for the securing of big quantities of compressed air with the smallest possible weight of compressor. Secondly, for the best utilization of the combustion gases expansion, in order to develop propelling or lifting force. As can be seen, the specific application of the motor on the disk shaped aircraft of vertical take-off, combines the advantage which the rotor brings when the combustion chambers are on its circumference, namely, the rotor is a centrifugal compressor also. Air is sucked from the center and it is centrifuged out to the circumference where it firstly meets the combustion chambers which periodically are filled and, secondly, it meets the distributor and the nozzles which sufficiently cool.

With respect to the pressure expansion of the combustion gases to the nozzles and the development of the propelling forces it must be noticed that the periodicity of their operation presents some disadvantages but greater advantages. As a disadvantage, the subject of the noise is of no worth as far as the interruption of the operation of a nozzle is simultaneously followed by the operation of another which has the same efflux. That is, it happens as if there is no interruption of the combustion gases expulsion to the space. As it concerns the discontinuous expulsion to the nozzles, they disturb the regular flow and efficiency of the nozzles. However, this loss is not large because there is no pressure expulsion of each one chamber separately but all the chambers of a row conduct their combustion gases pressure continuously to the same nozzle so that its immediate cooling will follow. That is, big quantity of combustion gases (of all the chambers of a row) is continuously expanded to each nozzle. So, the disturbances of the starting and ending of this expulsion do not produce serious damage to the total expulsion.

However, opposed to these disadvantages, there are many advantages to the periodic operation of the nozzles, such as:

(1) Because of the intermediate cooling of the nozzles, they can be fed with combustion gases of any temperature without the danger of their overheating. This possibility, in combination with the ability of big fluctuation of the air-fuel ratio within the cumbustion chambers (without danger of flame interruption) provides an ideal way of varying lifting force at the various points of the disk shaped aircraft circumference. That is to say, there can be a desireable stabilization and steering of an aircraft in space by the automatic increase or decrease of the fuel quantity which is fed to three or more points of the circumferential stationary distributor.

(2) The periodicity of the nozzles operation is followed by constant volume combustions of the chambers which produce combustion gases with a pressure multiple that of the sucked air. That is, for the same mediate pressure of the combustion gases, small demand of air compression is indispensable in the described motor. This involves a big decrease of the motor weight and very simple construction of the motor because the air compression of high degree is the primary cause of the total aggravations of the existing turbojets.

OPERATION PHASES AND VARIOUS TYPES OF MOTOR

In FIG. 1 there is illustrated the typical shape of the disclosed motor wherein the combustion chambers have a staggered or zig-zag shape or form the design of the Greek meander. The "inside" or "up" chambers are designated M, E the "outside" or "down" chambers and K the "relation" chambers (which are "inside" and "outside" or "up" and "down") to interconnect groups of chambers. Each row of chambers O is constituted of chambers of the same kind which are found between two successive "relation" chambers K.

Figure 2:
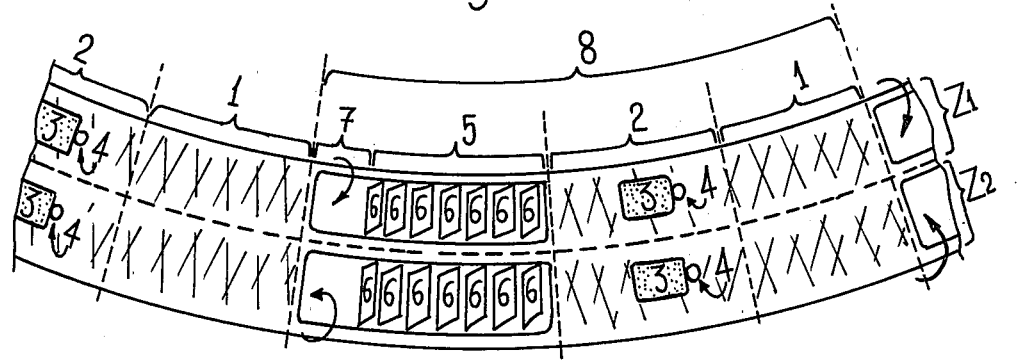
FIG. 2 is a schematic plane view of a portion of the distributor used in conjunction with the combustion chambers of FIG. 1.

A distributor d is shown in FIG. 2 which corresponds to the combustion chambers of FIG. 1. This distributor and the combustion chambers are exactly opposite to each other with a very short distance between them in the assembled motor. There are two zones of the distributor $Z_1$ and $Z_2$ of which, $Z_1$ corresponds to the "inside" chambers M, and $Z_2$ corresponds to the "outside" chambers E.

Along the distributor there are also several parts. A distributor surface 1 closes the openings of the combustion chambers so that they are filled with the pressure of the supplied air. That is, the filling of the chambers with new air takes place at that time period when the chambers are over the distributor surface 1. A distributor surface 2 closes again the openings of the combustion chambers as above while, in addition, interrupts the intercommunication of the combustion chambers with the source of the compressed air. A slot or recess 3 is found in the upper surface 2 and permits the transmission of the flame from each one chamber to the other. Fuel is supplied through a conductor 4. A distributor area 5 has openings therethrough to permit the expulsion of the combustion gases pressure at the time that the combustion chambers pass through this area. 6 is a specific formation of the abovementioned area 5 of the distributor, i.e. blade or nozzles, etc., depending on the various applications of the motor. 7 is a rinsing area of the combustion chambers. That is, direct intercommunication of the chambers with the outside space (atmosphere) with simultaneous starting of the air inlet within them.

The total of the above surfaces and components of the distributor (1-7) which are necessary for the completion of a working cycle of the combustion chambers, are designated in the above distributor as a "unit" 8. There can be many "units" 8 on the distributor surface (but always an integral multiple). In the cases of the rotating distributor an even number is selected for balancing reasons.

Figures 3, 4:
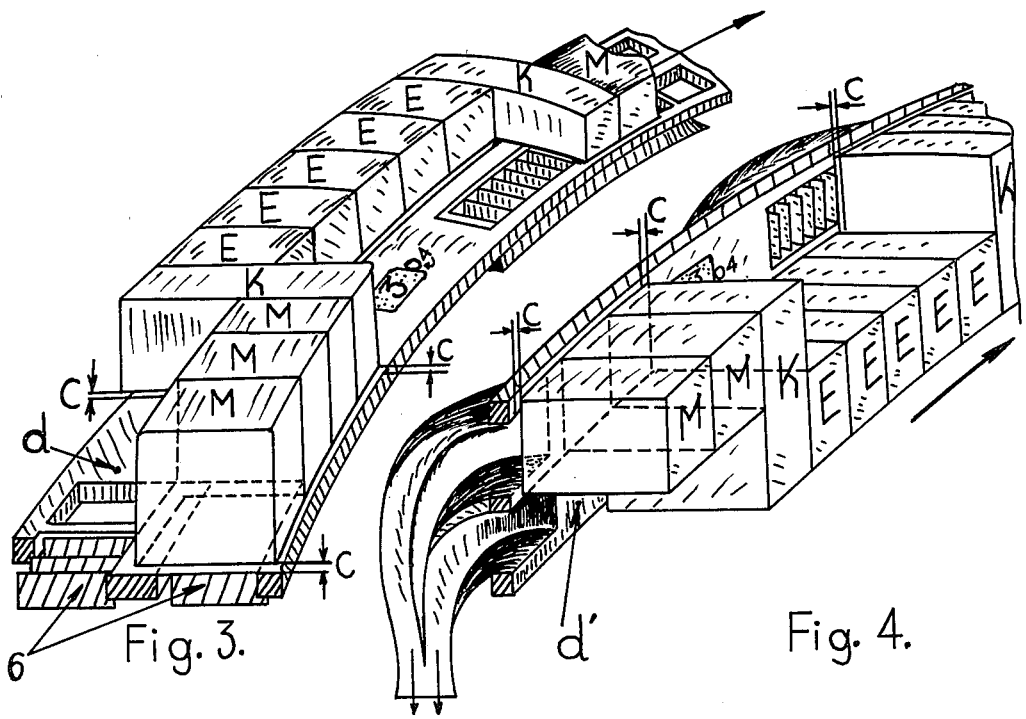
FIG. 3 is a perspective view of one arrangement of the combustion chambers and distributor of the engine.
FIG. 4 is a view similar to that of FIG. 3 and showing another arrangement of the combustion chambers and distributor.

In FIGS. 3 and 4 there are shown two principal arrangements of the combustion chambers and distributor. In FIG. 3, the distributor d is a plane surface of an annular ring. The combustion chamber openings opposite to the distributor are also located on a plane surface. In FIG. 4 the distributor d' is a cylindrical surface. The combustion chamber openings opposite to the distributor d' are also located on a cylindrical surface. In both FIGS. 3 and 4 there is a distance C which is between the combustion chamber openings and the distributor surface. This distance is of the order of tenths of a millimeter. In the arrangement of FIG. 3 the names "inside" and "outside" chambers have a real geometrical meaning. In the arrangement of FIG. 4 there are not "inside" and "outside" chambers but "up" and "down" chambers. In both cases the succession of the chambers M and E can be distinguished because of which the distributor zones are periodically left free so that they will be sufficiently cooled (with air current) after being subjected to the overheated combustion gases.

The arrangement of FIG. 4 is preferably for large diameter distributors because the cylindrical distributor does not stand serious stresses of bending caused by the gas pressures within the combustion chambers. This arrangement is applied on disk shaped vertical take-off aircraft in which the distributor (which consists of cylindrical parts) and the nozzles belong to the fixed structure of the aircraft.

Figure 5:
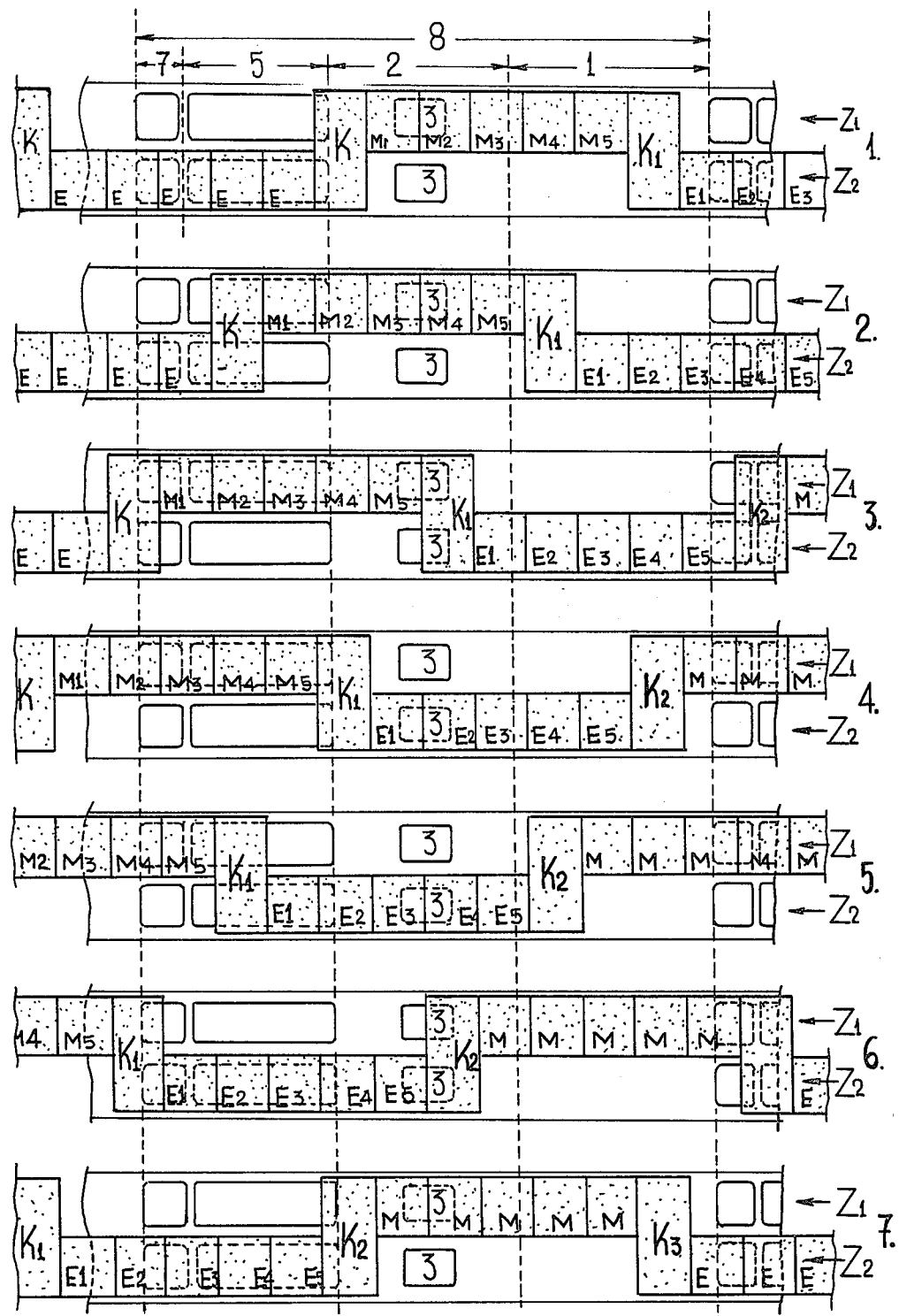
FIG. 5 is a diagrammatic representation of a stationary distributor and movable combustion chambers in seven different phases.

In FIG. 5 there is shown the distributor and one of its "units" 8 on a fixed structure. In front of the distributor, the combustion chambers has been moved to the left in seven successive phases (indicated 1–7 at the right of FIG. 5). The displacement from the one phase to the next one is the same as the length of two combustion chambers. The purpose of FIG. 5 is to show the course of the flame transmission and the successive cooling of the different parts of the distributor.

In phase 1, the slot 3 of the distributor's zone $Z_1$, intercommunicates with the combustion chambers $M_1$ and $M_2$, i.e. transmits the flame from the combustion chamber $M_1$ to $M_2$. The slot 3 of the zone $Z_2$ and part of the surfaces 1 and 2 of the distributor do not have the combustion chambers over them and, consequently, they are exposed to strong cooling from the air current which is blowing against them.

In phase 2, the flame has reached up to the combustion chamber $M_4$. The slot 3 of the zone $Z_2$ is continuously cooled and the cooling of the nozzles of the zone $Z_2$ has been also started, i.e. of the area 5 of the distributor.

In phase 3, the flame is transmitted to the "relation" chamber $K_1$ in which the existing air-fuel mixture is ignited. As long as this chamber extends downwardly, i.e. to the area of the "outside" chambers E, the flame can now be transmitted through the other slot of the zone $Z_2$ to all the "outside" or "down" chambers E. During this transmission of the flame to the "relation" chamber $K_1$, there may be a problem. That is, as it also appeared in the drawing, this chamber ceases to be tight because of the starting of its intercommunication with the slot 3 of the zone $Z_2$. But also, in the further movement of the "relation" chamber $K_1$ to the left, it will tend to intercommunicate with the outside space, through the other slot 3 of the zone $Z_1$, something which is not desired because it is assumed that the combustion pressure will be developed within the chamber.

These difficulties are overcome with the addition of two flat projections in both sides of the "relation" chambers, the length of which is the same with the length of the slots 3. These projections or bonnets A are on the same level with the combustion chamber openings, i.e. they are parallel to the distributor and are spaced from it the same distance that the combustion chamber openings are spaced. In this phase 3 the cooling of the nozzles of the zone $Z_2$ is completed and the cooling of the area 2 of the zone $Z_1$ starts.

In phase 4, the flame has already been transmitted to the "outside" chambers and in this phase it is transmitted from the chamber $E_1$ to the chamber $E_2$ through the slot 3. At the immediately previous phase (3), the transmission of the flame had taken place from the "relation" chamber $K_1$ to the chamber $E_1$ through the same slot 3. During this phase 4 there is a continuation of the cooling of the zone $Z_1$ of the distributor. This cooling concerns mainly the slot 3 and the area 2 of the Zone $Z_1$, which are assaulted by the high temperatures of the combustion gases of the previous phases.

In phase 5, the flame is transmitted from the chamber $E_3$ to the chamber $E_4$. The cooling of the zone $Z_1$ is also continued to the nozzles 5.

In phase 6, the flame is transmitted to the "relation" chamber $K_2$. The cooling takes place at the end of the zone $Z_1$ and at the beginning of the zone $Z_2$.

In phase 7, the flame has been transmitted again to the chambers M, i.e. this is exactly the same as phase 1. Subsequently, the same cycle as above is repeated.

Figure 6:
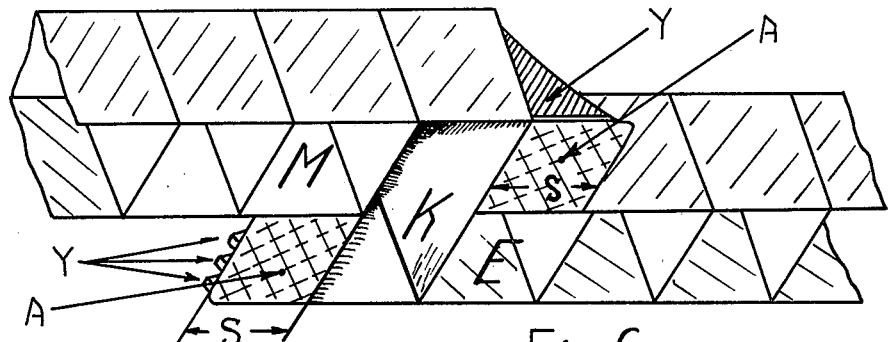
FIG. 6 is a perspective view showing a relation chamber and its bonnets with respect to two sets of combustion chambers.
Figure 7:
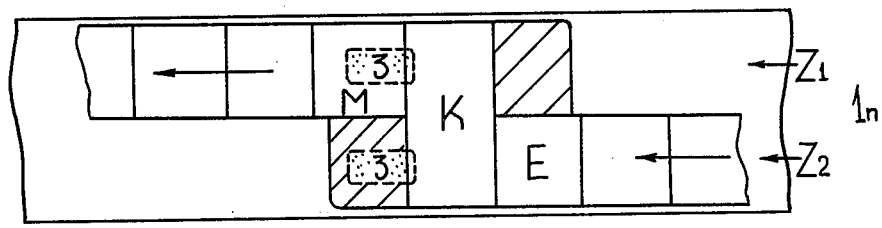
FIG. 7 is a diagrammatic representation of the operation of the relation chamber and its bonnets shown in four successive phases.
Figure 7:
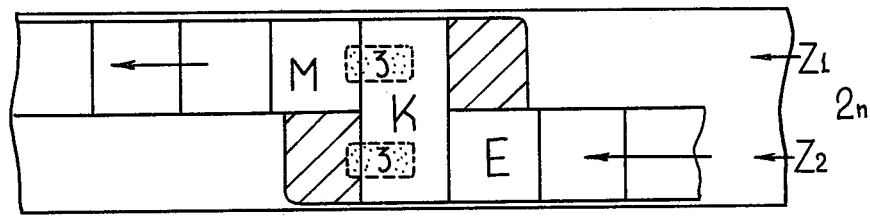
Figure 7:
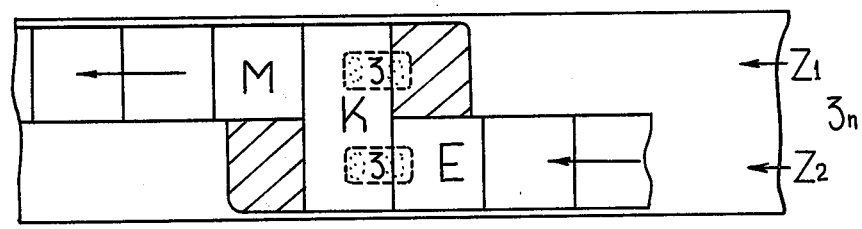
Figure 7:
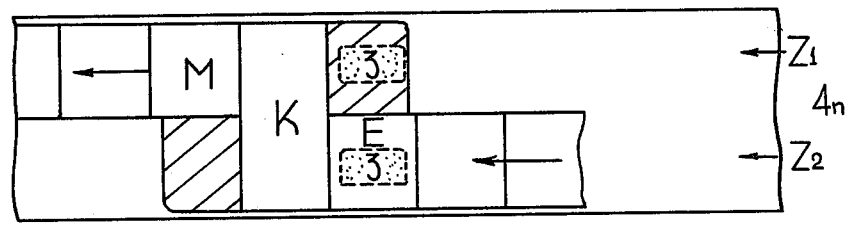

In FIGS. 6 and 7 there are shown the structural shape and the operation of the bonnets A. In FIG. 6, a "relation" chamber K is shown with its two bonnets A, which are found in both of its sides and diagonally opposed from each other. Behind these bonnets A there are transverse plates Y, like reinforcing supports, so that the bonnets are not bend because of the combustion gases which enter under their surface through the slots 3 of the distributor. The bonnets A are plane surfaces which are located on the same level as the openings of the combustion chambers.

Each bonnet has a length S which is a little longer than that of the slots 3 which are on the distributor for the flame transmission. Because of this length, which exceeds that of the slots 3, undesireable intercommunications of the chamber K with the outside space (atmosphere) is avoided at that phase during which the flame is transmitted through this chamber.

In FIG. 7, the operation of the "relation" chamber K and its bonnet is illustrated in four successive phases $1n$–$4n$.

In the first phase $1n$, the flame is within the chamber M and is going to be transmitted to the "relation" chamber K. For this purpose the intercommunication of the chambers M and K has already been started. That is, part of the slot 3 of the zone $Z_1$ has entered within the chamber K. The lower bonnet covers the slot 3 of the zone $Z_2$, so, in spite of the fact that this slot has to a slight degree entered within the chamber K, the tightness of the chamber K is preserved. The only thing which will happen is that a small quantity of the compressed air of the chamber K will find the slot 3 of the zone $Z_2$ which is covered by the bonnet.

In phase $2n$, the slots 3 are positioned with a major portion thereof within the "relation" chamber K. That is, the flame has now entered sufficiently within the chamber K and the combustion will have developed high pressure of the combustion gases. Even in this phase, the tightness of the chamber K is good, because of the lower bonnet which covers the slot 3 of the zone $Z_2$.

In phase $3n$, the flame transmission from the chamber K to the chambers E has been started through the slot 3 of the zone $Z_2$ (definitely in the first chamber E). The slot 3 of the zone $Z_1$, in spite of the fact that a portion of it is located out of the chamber's K opening, is not able to permit escape of the chamber's K combustion gases to the outside (atmosphere), because it is covered with the upper bonnet. Consequently, the tightness is preserved.

In phase $4n$, the flame, i.e. combustion, has been transmitted to the chamber E. The slot 3 of the zone $Z_1$ is completely covered with the upper bonnet and consequently it does not intercommunicate with the chamber K. The combustion gases high pressure has been isolated within the chamber K because of the combustion which took place previously. Immediately after that, this pressure is expelled to the nozzles with which the chamber K will intercommunicate. There is a small quantity of combustion gases within the slot 3 of the zone $Z_1$, because of the preceding intercommunication of the slot 3 with the chamber K. This small quantity of the combustion gases is left to escape to the atmosphere, as soon as the upper bonnet proceeds a little to the left, when the slot 3 is uncovered. The bonnets A, as described previously, are there only in the "relation" chambers K and are not overheated because:

(a) There is not a continuous efflux of the combustion gases under their surface, but a simple preservation of a small quantity of combustion gas, which corresponds to the volume of the slots 3.

(b) As they are projected surfaces, they are strongly cooled by the same air current which also cools all the distributor parts.

In FIGS. 8-18 there are shown different variations of the motor disclosed herein.

Figure 8:
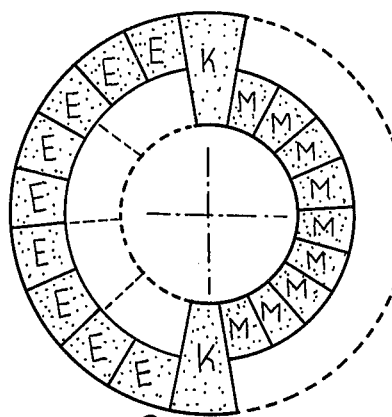
FIG. 8 is a top plan view of the combustion chambers of a motor according to the present invention wherein the combustion chambers and their openings are in a plane surface.
Figure 9:
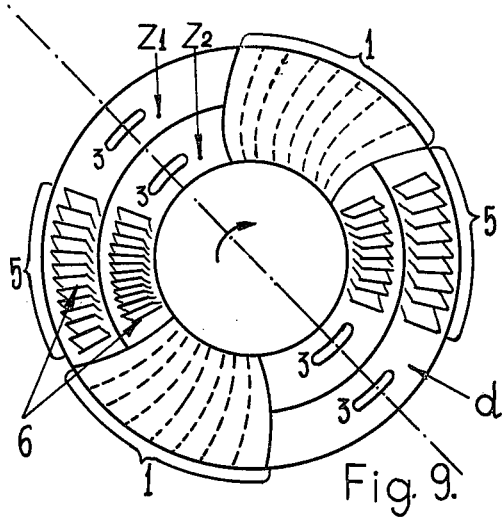
FIG. 9 is a top plan view of the distributor used with the combustion chambers of FIG. 8.
Figure 10:
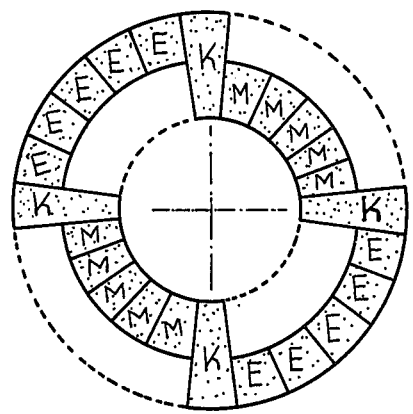
FIG. 10 is a top plan view similar to that of FIG. 8 but showing multiple rows of combustion chambers.

In FIG. 8 there is illustrated a typical shape of the combustion chamber of the plane motor in which the combustion chamber openings and distributor are located on a plane surface. In this FIG. 8, there are two rows of combustion chambers (one "inside" and one "outside"). The distributor d for the plane motor with two "units", i.e. two working cycles on its surface is shown in FIG. 9. As it was mentioned above, instead of two rows of chambers there can be many rows (even multiple). In FIG. 10 part of the combustion chambers with two couples of rows (i.e. chambers "inside"-"outside"-"inside"-"outside") is illustrated.

Figure 11:
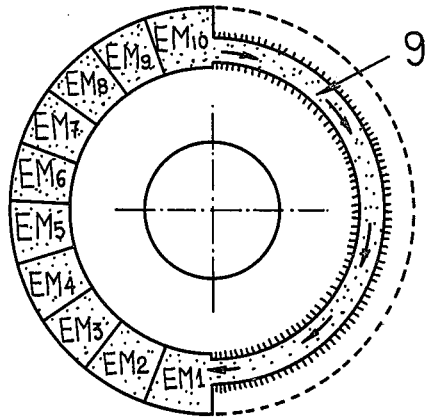
FIG. 11 is a top plan view of a simplified motor wherein there is only one row of combustion chambers.

However, there is a sole case too, which is illustrated in this FIG. 11 wherein there is only one row of combustion chambers. Their "simplified" shape can best be applied on motors of small power. In this simplified shape, a conductor 9 which intercommunicates the two endmost chambers ($EM_1$ and $EM_{10}$), has taken place as a whole row of chambers and both of the "relation" chambers. The combustion chambers are designated EM, i.e. "inside" and "outside", because there is only one row of chambers. According to FIG. 11, these chambers occupy one half of the circumference. The other half of the circumference is free for cooling of the distributor. The distributor, instead of the two zones $Z_1$ and $Z_2$, as it was developed in the bove, will have only one zone, because of the sole row of the chambers. However, it will have on its circumference at least two "units" (like the distributor of FIG. 9) so that when one of them will transmit the flame to the chambers EM, its symmetrical one, will be sufficiently cooled, out of the chambers. These two "units" are continuously alternated at the phases of the operation or cooling during the relative rotation of the distributor.

When the flame has reached out to the chamber $EM_{10}$, it is also transmitted to the chamber $EM_1$ through the conductor 9. By this way, when the slot of a "unit" of the distributor leaves from the chamber $EM_{10}$, as to be able to be cooled, the slot of the second "unit" of the distributor starts to operate, i.e. transmits the flame from the chamber $EM_1$ to $EM_2$ etc. Thus, the flame transmission is continuous. If the distributor "units" are increased, the area of the combustion chambers can be increased or decreased. That is, to take more or less than the half of the circumference. For example, for four "units" of the distributor, the combustion chambers can occupy $\frac{3}{4}$ or $\frac{1}{4}$ of the circumference. By this way, the length of the conductor 9 has been decreased which in spite of the fact that it is cooled by blades externally, suffers because of the high temperatures of the combustion. That is why it is profitable to decrease its length.

The cases of increase or decrease of the combustion chambers area (e.g. 5/6 or 1/6 of the circumference) concerns two completely different applications. In the first one, the combustion temperatures must be low (e.g. like a boiler of heating) because the distributor cooling is lessened, as far as the smaller part of the circumference is free for the purpose of the cooling. In the second one, there can be had combustion gases of highest temperature for many uses. These high temperatures of the combustion gases are permitted because there is a very long duration of cooling of the distributor "units". In this second case the intercommunication conductor 9 connects the bottoms of the two endmost combustion chambers.

Figure 12:
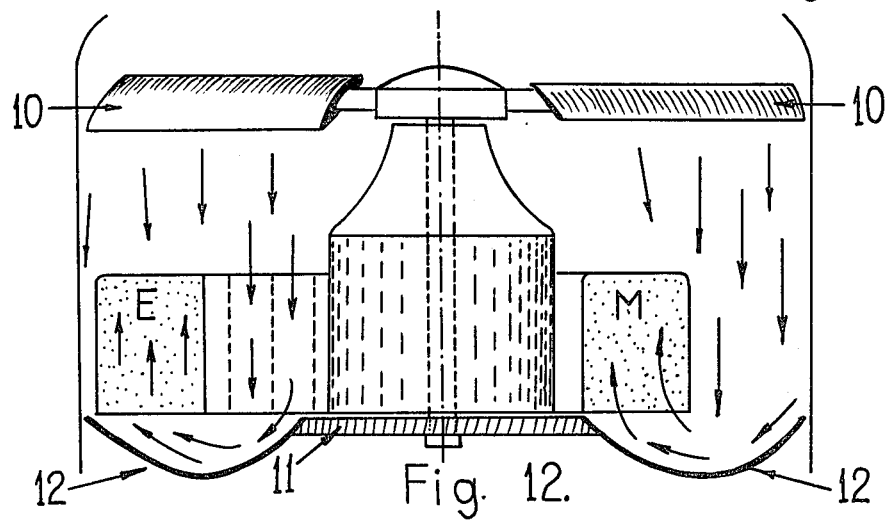
FIG. 12 is a side elevational view with portions removed of a motor according to the present invention having structure for distributing air to the combustion chambers.

FIG. 12 shows a motor in which the air necessary for the combustion is distributed to the combustion chambers by the "drive" of the distributor. An axial fan 10 creates an air current of high speed which proceeds downward and meets a distributor 11. As those points of the distributor's circumference which correspond to the phases of the combustion chambers filling, there are bent plates 12 which deflect the air efflux to the interior of the combustion chambers. The distributor is like the one which is illustrated in FIG. 9 in which the areas 1 of the plates of the air deflection are also seen. The combustion gases of the combustion chambers, falling on the blades 6 of the distributor, provide the power for the rotation of the distributor and the axial fan which are mounted on the same shaft. The same air current of the fan 10 cools the combustion chambers externally and all the parts of the distributor.

Figure 13:
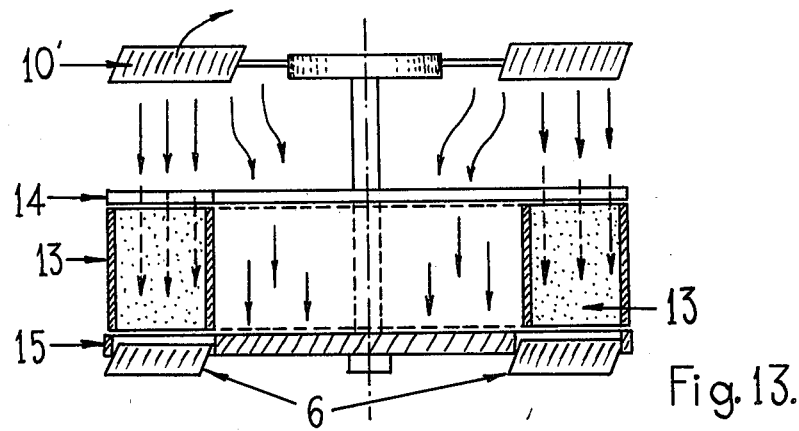
FIG. 13 is a vertical sectional view of another form of the motor wherein the combustion chambers are supplied with air from openings at their upper portions.

In the motor of FIG. 13, combustion chambers 13 are supplied with air from the second openings which are found at their upper part. These openings are closed and opened successively by a metallic surface 14 which is rotated with the distributor 15 and the axial fan 10'. The air efflux is straight. That is, air is primarily pushed downwardly by the axial fan 10'. Air then enters the combustion chambers at that time when their openings are not covered with the metallic surface 14 which is not a complete circle but is made of cyclical sections. After the closing of the upper and lower openings of the combustion chambers with the help of the metallic surface 14 and the distributor 15, the combustion takes place successively within them. The combustion gases, being expanded downwardly, provide the necessary power for the distributor rotation of the surface 14 and of the axial fan 10' with the help of the blades 6 of the distributor. The same air which is flowed from the axial fan 10' cools the distributor 15 and the rotating metallic surface 14.

Figure 14:
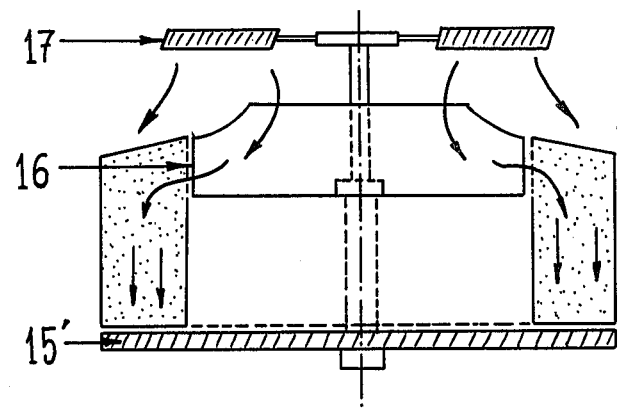
FIG. 14 is a vertical sectional view of still another form of the motor wherein air is distributed to the combustion chambers from upper lateral ports.

In the modification of FIG. 14 air is distributed to the combustion chambers through the upper lateral ports. That is, even the cylindrical surface 16 which opens or closes periodically the openings or the ports of the combustion chambers is rotated with the distributor 15' and the axial fan 17'.

Figure 15:
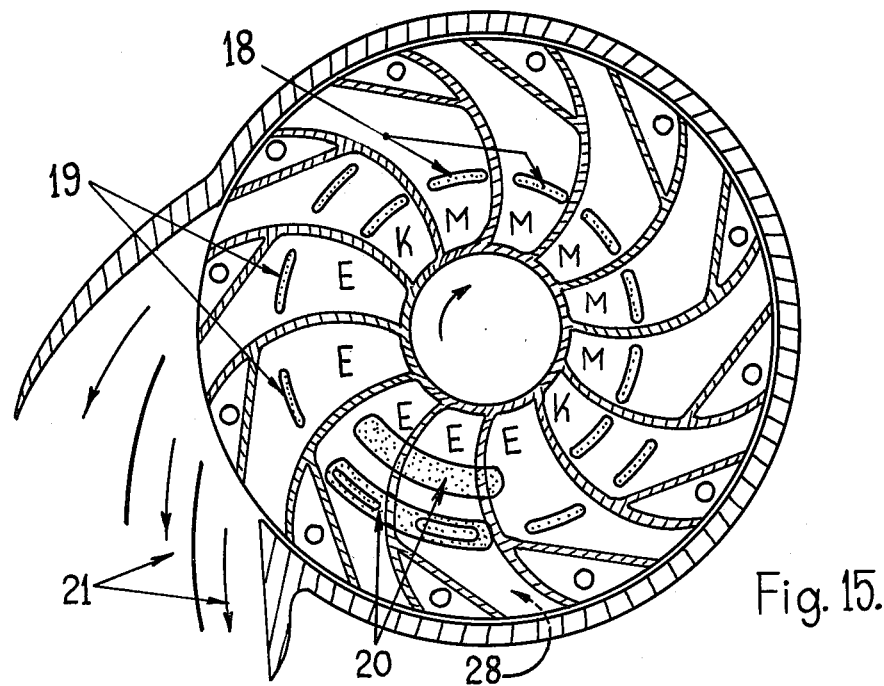
FIG. 15 is a top plan view in section of a motor wherein the communication parts of the chambers are positioned in inside and outside rows.

FIG. 15 shows a motor variation where there are not "inside" and "outside" or "up" and "down" chambers, but chambers each one of which is similar with the other, but with ports which are placed in rows "inside" and rows "outside". These ports provide the flame transmission from each chamber to the next. In FIG. 15 can be seen the chambers M which have the "inside" ports 18, chambers E with the "outside" ports 19 and "relation" chambers K with the "inside" and "outside" ports 18 and 19. There can also be seen both the slots 20, whose purpose is the flame transmission, as above. These slots 20 of the fixed distributor 28 are located before the expulsion phase which takes place in the nozzles 21 and they operate alternately. That is, when one slot transmits the flame, the other one slot is cooled. The purpose of the chambers O is to cool the circumferential casing and, especially, the area near the nozzles 21 which is subjected to the overheated combustion gases.

Figure 16:
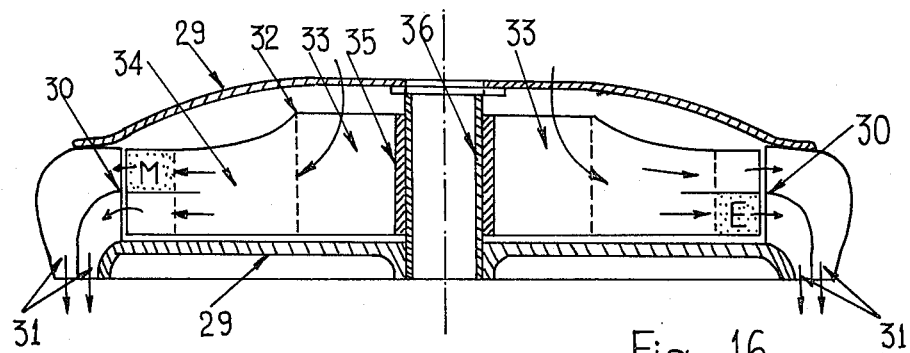
FIG. 16 is a vertical sectional view of a form of the motor preferred when great power is required.

FIG. 16 illustrates that kind of motor which appears the most advantageous in those cases where great power is demanded. This kind of motor will be described as applied to the disk-shaped vertical take-off aircraft. This modification is essentially a cylindrical motor on which the openings of the combustion chambers and distributor are located in cylindrical surfaces. This motor usually has a fixed distributor and rotating combustion chambers and is also shown in FIGS. 17 and 18.

In FIG. 16 can be seen the fixed part 29 of the motor on which a cylindrical distributor 30 is supported. Nozzles 31, which convert the combustion gases pressure into propelling force, are located on a peripheral projection of the distributor. A rotating member 32 which has on its circumference combustion chambers M, K and E, is also a centrifugal compressor. That is, it sucks the air from its center 33 and centrifuges it to the circumference with the help of the curved plates 34. Air, during its progress toward the circumference, fills the combustion chambers with the necessary air for the combustion on the one hand and, on the other hand it cools periodically the distributor and the nozzles, as was described above. In the center of the rotating member, instead of a shaft, there can be a cylindrical brass sleeve 35 journalled around a fixed shaft 36. This construction can be used only in propulsion under reaction, i.e. by the expulsion of combustion gases where the rotating shaft is not necessary. However, this motor can also be used for propelling vehicles and generally for any machine. In these applications there will be a rotating shaft on the rotating part which will transmit the useful power of the motor.

Figure 17:
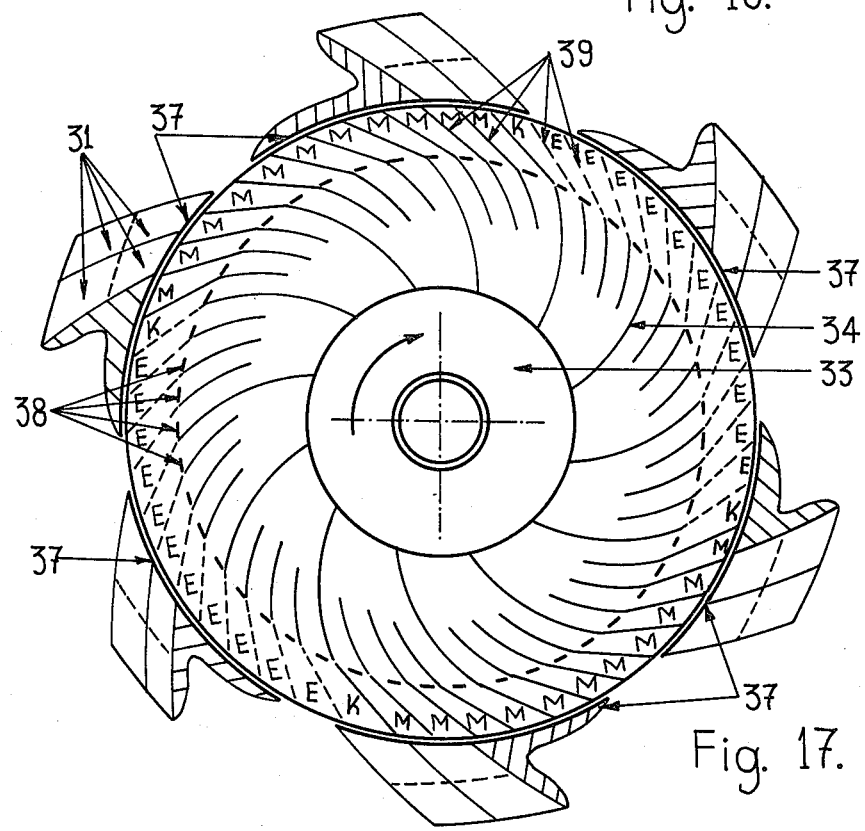
FIG. 17 is a top plan view in section of the motor of FIG. 16.
Figure 18:
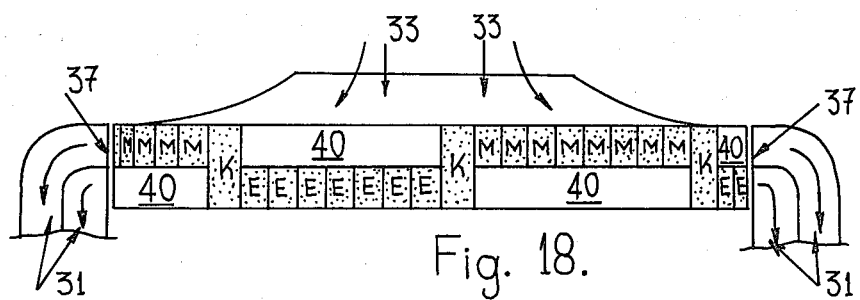
FIG. 18 is a diagrammatic view showing the arrangement of the combustion chambers of the motor of FIGS. 16 and 17 when viewed in elevation.

In FIG. 17, the "units" 37 of the distributor are seen (6 "units" drawn) in which the periodic operation of the combustion chambers takes place as described above. These "units" 37 are separate cylindrical structures and this facilitates the assembly of a large diameter motor. In FIG. 17 can also be seen plates 38 which permit the entrance of the air into the combustion chambers. Should the flame (combustion gases under pressure) reach up to an unintended combustion chamber, the plates 38, pushed by pressure, close the air inlet and isolate that combustion chamber. Inversely, after the combustion expulsion from the openings of the combustion chambers because of the created depression and the air impulse of the centrifugal compressor, the plates set in and permit the entry of a new quantity of air. Maintaining the openings opened for a short period of time, also permits the desireable cleaning of the combustion chambers. On the upper or lower surface of the centrifugal compressor and near the combustion chambers there are removeable plates the purpose of which is to survey or substitute the plates 38.

This method of supplying air which appears to be like that of the pulse jet, has the advantage of the straight flow of the air without intervention of other conductors. However, it is not the only one. That is, the combustion chambers can be completely closed at the locations of the plates 38 and the air feeding can occur from their openings through the distributor. In this case, the centrifugal compressor's air is distributed over or below the combustion chambers to an air diffuser which is set parallel to the distributor. The air diffuser intercommunicates with the distributor's "units" and especially with their areas which correspond to the phases of the combustion chambers filling with air. The compressed air thus fills the combustion chambers through their openings. The many "units" of the distributor, as it was mentioned above, are an important advantage for the motor application on vertical take-off aircraft. There are six (or more) expulsions of combustion gases to the aircraft's circumference which can secure its stabilization and steering in space as it will be described below.

In FIG. 17 can also be seen that walls 39 of the combustion chambers have an oblique direction. The purpose of walls 39 is the combustion gases expulsion to such a direction to create a circumferential power so as to rotate the circumferential compressor. The partial conversion of the combustion gases pressure into speed, as to have rotation of the centrifugal compressor by reaction, is helped also by small plates which are set at the openings of the combustion chambers.

In FIG. 18 there is shown the abovementioned arrangements of the combustion chambers, i.e. "up" chambers "down" chambers "relation" chambers. Under the chambers M or above the chambers E the free spaces 40 of the centrifugal compressor are seen through which air is distributed directly to the cooling surfaces of the distributor and its nozzles for their periodic cooling.

Figure 19:
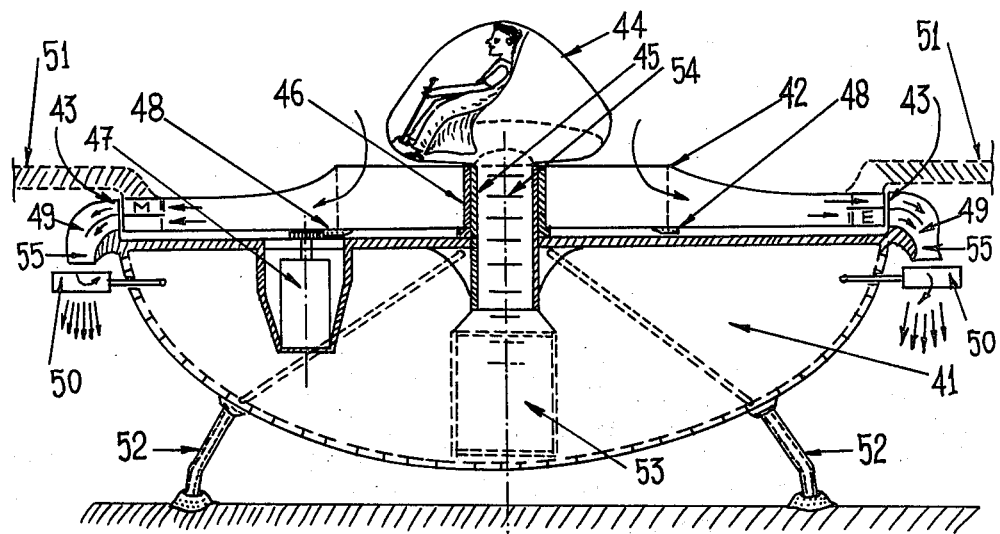
FIG. 19 is a vertical sectional view of a VTOL aircraft incorporating the motor of the present invention.
Figure 20:
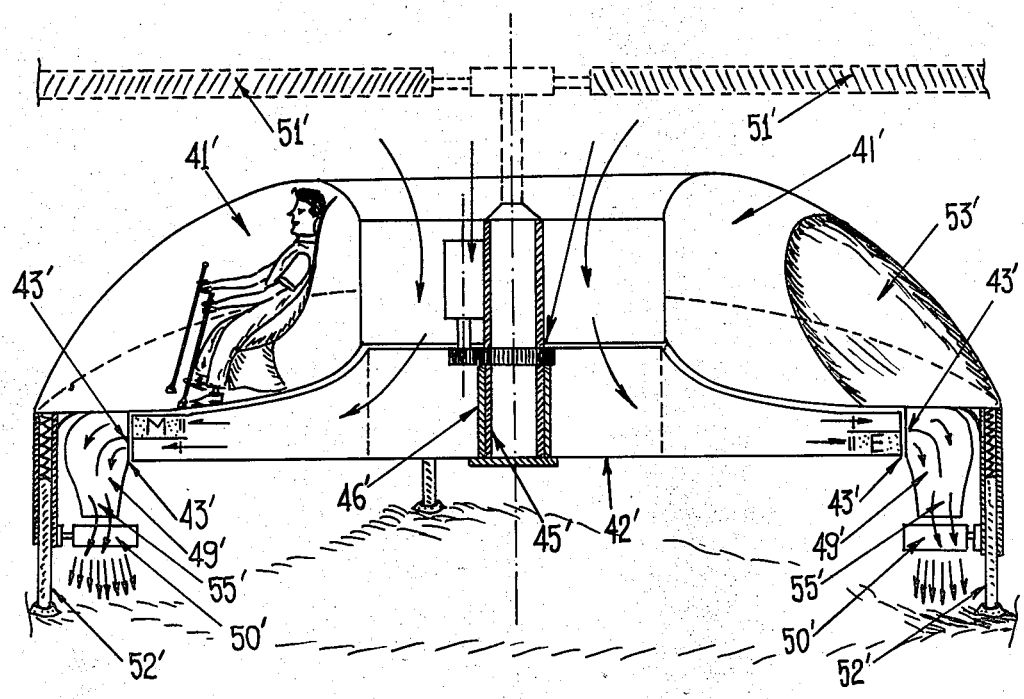
FIG. 20 is a vertical sectional view of another form of aircraft incorporating the motor disclosed herein.

In FIGS. 19 and 20 there are two arrangements of the motor application on disk-shaped vertical take-off aircraft. The described motor appears to fill a gap in the development of motors of internal combustion. That is, this motor uses periodic operation of the combustion chambers although it is not a piston engine. It utilizes constant volume combustion with a relatively simple structure although it is not a pulse jet. It can burn various combustion gases and petroleum although it is not a diesel. It has an ability to maintain one or more "fire places" of combustion (with the method of the transmitted flame), although it is not a system of gas turbine which also has fire place of continuous combustion of fuel. It has a continuous rotary motion like a turbine and it can expell gases out of its nozzles although it is not a turbo jet.

In FIG. 19 there is shown a lower casing 41 which is the main space or frame of the craft and is simultaneously the fixed part of the motor. A rotating centrifugal compressor 42 with the circumferential combustion chambers M, K, and E is supported on casing 41. On the circumference of the casing 41 the "units" 43 of the distributor are also supported. To provide visibility for the pilot a control cabin 44 is mounted over the rotating centrifugal compressor. This small cabin or chamber is supported on the casing 41 upon a tubular member 45 the diameter of which permits the installation of a ladder 54 in a passage within member 45 to provide access to the cabin. The existence of the chamber 44 over the compressor intake opening is beneficial to smoothing down the air flow and especially at high speeds of the aircraft's motion. At these high speeds, there will be an automatic change of the air speed to desireable pressure of compressed air. The centrifugal compressor 42 is rotated around the tube 45 by means of a bearing sleeve 46.

The centrifugal compressor's rotary speed is relatively slow because of its long diameter on the one hand and, on the other hand because of the small necessity of air compression. The utilization of the bearing (instead of ball bearings) is thus permitted and advantageous because it presents little vibration, noise and wear and its replacement is not necessary after a period of time of operation.

The initial starting is achieved with the help of an electric starter 47 and gearing 48 which is of a certain diameter on the lower surface of the centrifugal compressor. Instead of the electric starter a small gasoline engine may be used which will operate continuously for the starting of the main motor on the one hand and, on the other hand for the control of its rotations during its operation.

There can also be seen nozzles 49 for the expulsion of the combustion gases and the blades 50 under the nozzles and the combined discharge nozzles 55. The purpose of the blades 50 is the efflux deflection of the combustion gases so that autorotation of the craft is avoided and rotation of the craft to any direction can be carried out when it is desired. Blades 51 which are fastened on the centrifugal compressor's circumference would be used only in cases of private or transportation craft with mediate speed, that is, in those cases where economic operation or long flight is demanded.

A landing foot 52 equipped with proper strings for shock absorption are put in such places to avoid deformation of the craft because of abrupt landing. The entrance into the craft is through a lower port or hatch 53 up through ladder 54.

In FIG. 20 can be seen some of the same elements as in FIG. 19. The difference between this aircraft and the previous one of FIG. 19 is that the motor is located below the casing 41. The blades 51' are mounted on an extension of the shaft of the centrifugal compressor. The blades 51' provide for the economical operation of the craft as described above and are not required in cases where high speeds of motion are demanded. The motor of FIG. 20 does not require a special pilot's chamber 44 because there is excellent visibility through the casing 41' of the craft. For this reason, it will be employed on very small private craft while, the previous structure of FIG. 19, is intended for big transportation craft.

Figure 21:
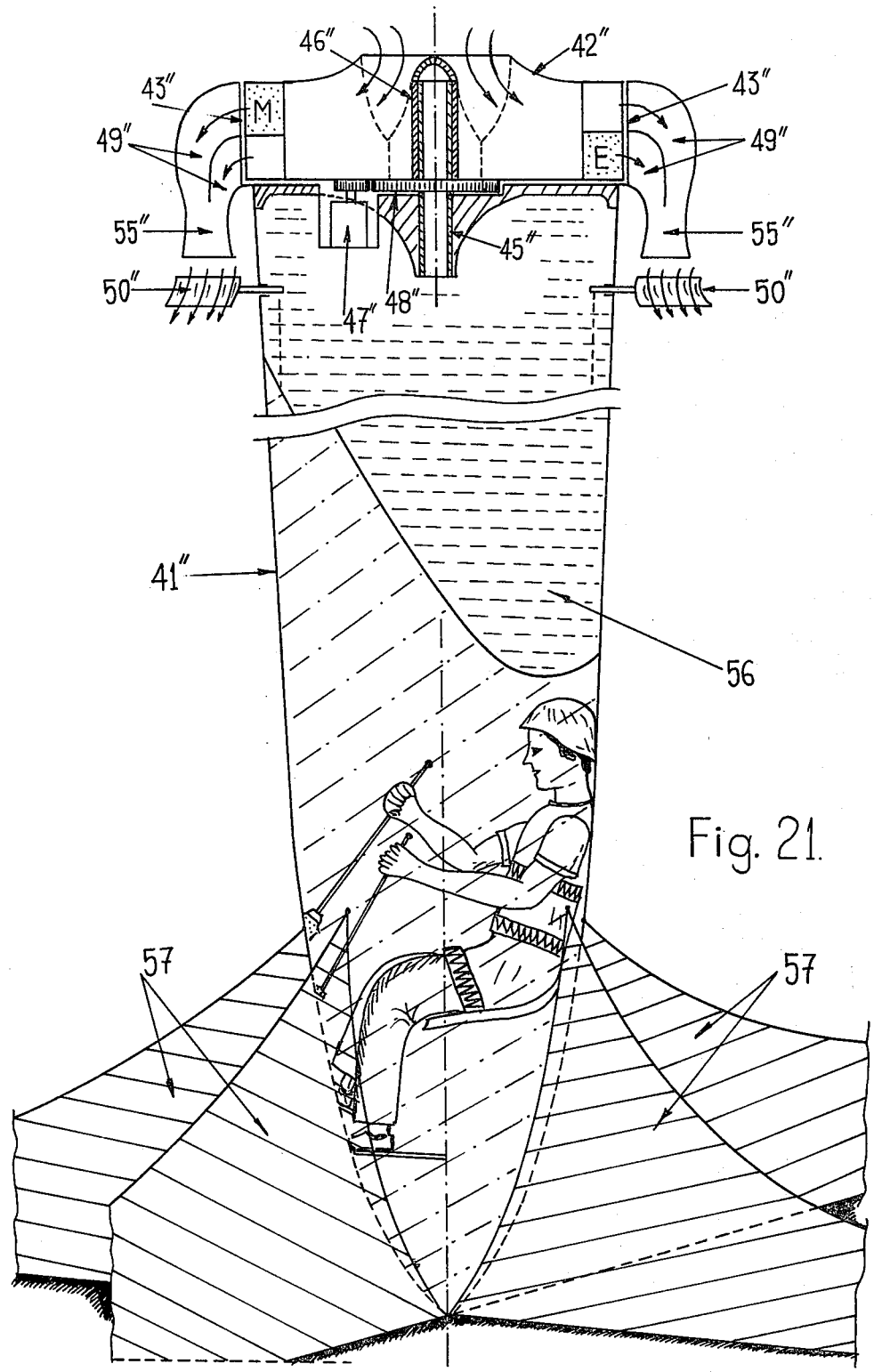
FIG. 21 is a side elevational view with portions thereof in section of still another form of aircraft incorporating the engine of the present invention.

In FIG. 21 there is disclosed an aircraft which can develop supersonic speeds. It can be manned or not. Its various components correspond with the same components described above. The fuel is stored in a compartment 56. The centrifugal compressor's diameter is relatively small (about 100 cm) and the largest number of rotations is about 6000 per minute. There is a length and height of the combustion chambers of 10 cm, compression 1.1 and four "units" of the distributor which produces power from the fuel of about 42,000 H.P. (i.e. consumption of 0.75 kg of fuel/sec.). Because there are no blades, the craft uses only the propelling force of its motor for its vertical taking off which ranges about 3500 kg. The motor weight will not exceed over 300 kg and the remaining casing of the craft not over 1200 kg. If a useful load of 400 kg is accepted, the craft can be supplied with about 1500 kg of fuel. That is, there will be a duration of the flight of about 33 minutes with the biggest force. In the reality, this duration will be multiplied because the craft does not require so great propelling force during its horizontal travel and the motor, as it is described below, rotates slower with a corresponding decrease in the consumption of fuel.

At the very high speeds, the consumption of the fuel becomes smaller, because of the improvement in the efficiency of the motor. This is due to the change of the air speed into pressure at the widening openings of the compressor. The elongated shape of the aircraft and the four metallic flat members 57 which simultaneously are its landing gear, neutralize the craft weight during its horizontal flight, by maintaining a slight bank with respect to the horizontal level. The general steering of the craft, as it is described below, can be carried out without blades operating with the air speed, which create problems at supersonic speeds. In the operation of the motors of FIGS. 19 and 20 (and partly of FIG. 21), the following points should be considered.

Motor power—Fantastic power can be attained with a small number of motor rotations and relatively short diameter of the disk-shaped aircraft. As an example, consider the following data:
(a) Rotary speed of the centrifugal compressor, 10 rotations per second.
(b) Centrifugal compressor's diameter, 200 cm and circumference's height of two combustion chambers, 20 cm.
(c) "Units" number of the distributor 8 (70 cm length of each one.
(d) Combustion chamber length (toward the center of the rotor) 10 cm.
(e) Supplied air pressure (within the combustion chambers) is 1.1 atmospheres (or a little greater than atmospheric pressure).
(f) Assume combustion of 1 kg of fuel per 15 cubic meters of air.

From the above data there will be obtained:
(a) Combustion chambers operation frequency, 80 per second or 4800 per minute. With the ignition method of the transmitted flame, this frequency permits the use of any liquid fuel.
(b) Air quantity of the combustion, 5.3 cubic meters per second.
(c) Fuel consumption, 0.35 kg per second. That is, because of the reasons mentioned above there is considered almost no excess of air.
(d) In the above fuel consumption there is a corresponding power of about 20,000 H.P. supplied to the motor by the fuel. This power can be made much greater by increasing the motor diameter, its rotary speed, its combustion chamber volume or the number of the distributor "units". The question is what will be the efficiency of the motor on the one hand and, on the other hand what are the results with respect to the flight ability and economization of the operation.

Efficiency of the motor—In spite of the fact that there has been accepted a very small air compression (1.1), the efficiency will be not too low because the motor operates according to the Atkinson cycle (constant volume combustion), where the efficiency depends upon the air compression degree and even from the final pressure or temperature of the combustion. The pressure and the temperature will be the highest possible which may be effected with no excess of air. This happens because there is an excellent external and internal cooling of all the motor parts. The efficiency will become better as the speed of the craft will increase. That is, because of the widening compressor opening, there will be a change of the speed of incidence of the air into desireable pressure.

Flight ability, economization of operation—The results of the motor application during the flight of the vertical take-off aircraft will be good because of the following factors:

(a) There is a light weight of the motor for a certain lifting force. This is due mainly to the low pressure of the air, which permits the feeding of enormous quantities of air for the purpose of the constant volume combusition and the development of combustion gases under pressure.

(b) Because of the slow rotary speed of the motor there will be very small centrifugal stresses which, as it is known, are proportional to the diameter and to the second power of the rotations. The centrifugal compressor thus can be constructed with plates of very small thickness and there will not be any problems of balancing, vibrations of operations or the like.

(c) The craft itself is simultaneously used as a fixed casing of the motor. This means a decrease of the total weight of the craft.

(d) The stabilization and steering mechanisms, as described below, are very simple in structure and do not involve significant cost or weight.

(e) The motor rotations can be easily increased or decreased to extensive limits when there will be a corresponding increase or decrease of the lifting or propelling force of the craft.

(f) Because of the very small mechanical and thermal stresses on the various parts of the motor there are no strict structural requirements, that is, utilization of special metals, expensive process, or the like.

(g) Because of the manner of the motor operation, utilization of a very large variety of fuels is permitted and at most, of the less rare and expensive ones. Regarding lubricants, the only lubrication parts of the motor are the central journal of the rotating compressor and the gearing of starting motor.

With respect to the operational economy which is a prerequisite for transportation or private aircraft it is known that it cannot be achieved with propulsion by reaction only. The economic operation of the craft require blades or air screws, rotated by the motor itself (against the speed of the craft). These blades (51 in FIGS. 19 and 20) in combination with the described motor, present the following advantages:

(a) Because of the small rotary speed of the motor there can be a direct connection of the blades with its rotating member without intervention of rotation reducer gears or mechanisms. Moreover, in FIG. 19 because of the blades 51 being fastened on the centrifugal compressor's circumference, there is a setting of the air screw with a minimum of additional weight.

(b) For the reason that the air compression is very low within the centrifugal compressor, the absorbed power is very small for this purpose. So, there is the possibility to dispose great force of the rotating part for the operation of the blades 51 which push downwardly large quantities of air, thereby creating corresponding lifting or propelling force.

(c) There is no necessity of inclination of the blades 51 for steering of the craft or increasing or decreasing of the lifting force for the reason that the steering is undertaken from the mechanism of the combustion gases expulsion as described below. The change of the lifting force is very simple by the combustion gases expulsion and the change of the rotational speed of the motor.

Stabilization-steering of the craft—The motor, as disclosed herein, is an excellent method of steering the craft because of its mode of operation. The distributor "units" (from which the combustion gases are expelled) are equally spaced on the craft circumference. By changing the quantity or the speed of the combustion gases which are expanded out of a "unit", there will be an increase or decrease of the lifting or propelling force in the corresponding location. Each one "unit" has its own conductor of fuel supply and that in the examples mentioned above, there has been considered a multiple of the distributor "units" 4 or 8, etc. Thus, in relation with the pilot or operator, a cross of distributors is formed (forward-backward-left-right), which provides the possibility to increase or decrease the lifting or propelling force at all the four sides of the craft by a change of the fuel quantity.

The speed change of the combustion gases in the nozzles of each one "unit" is made by a change of the air-fuel ratio by the change of the fuel quantity which is continuously fed to each one "unit". For example, if it is desired to lift the left side of the craft we must increase the fuel quantity in the left "units" of the distributor, or, inversely, to decrease the fuel quantity in the right "units" of the distributor. Due to the method of ignition by the transmitted flame, the decrease of the fuel quantity can be very great (smaller than half of the regular quantity) without danger or interruption of the combustion, in the corresponding "unit" of the distributor.

More than the change of the combustion gases speed, the steering can be amplified by the change of the quantity of combustion gases to each one "unit" of the distributor. At the time that the combustion gases of a row of combustion chambers are expelled out of one nozzle, the air of the cooling is distributed by the other nozzle of the same "unit" of the distributor. So, at their common exit or discharge opening 55 there is combustion gas of very high temperature on the one hand and, on the other hand a large quantity of air which can create a new significant combustion for short periods of time. Expulsion of a quantity of fuel to any of the nozzles is sufficient for its immediate ignition induced to the common exit 55 of the nozzles.

During the phases of taking-off and landing, the stabilization of the craft to its horizontal position takes place automatically. This is necessary because the operator will be occupied with two other important tasks, namely, the regulation of the lifting force for regular landing or taking-off on the one hand and, on the other hand the control of the autorotation of the craft through the blades 50. For the above automatic stabilization, there will be a simple system of a pendulum with valves, circumferentially positioned around it so that at the smallest deviation from the horizontal level of the craft the valves, been forced, will distribute the fuel as above to the various "units" of the distributor. When the craft is at a high altitude and has attained some speed, the fuel distribution to the distributor "units" and, consequently the steering, are manually made, that is, by removal of a bar.

Rotation of the craft(hull)—The purpose of the blades 50 is to avoid the autorotation of the hull on the one hand and, on the other hand to rotate it at the direction that the operator wishes. The blades 50 correspond in number to the number of the distributor "units". They are located under the nozzles 55 and deflect the discharged combustion gases in order to create a rotating movement of the hull. The inclination which is given to the blades 50 (the same for all) is manually controlled by the operator through a bar or cyclical rudder.

Change of the lifting or propelling force of the hull—Slow increase or decrease of the lifting (or propelling) force of the hull can be achieved by varying the motor rotations. This change is permitted within very large limits for the following reasons:

(a) A significant change of the air pressure does not result within the combustion chambers because of an increase or decrease of the motor rotational speed because of the corresponding decrease or increase of the time period which is required for filling of the combustion chambers. As much as the rotations increase, so much the time period of the filling becomes shorter and does not permit the significant lifting of the air pressure within the combustion chambers. Opposed to this, at slow motor rotational speeds, the centrifugal air speed is slow and the time for the cleaning and filling of the combustion chambers is long. So there will be regular renewal of the combustion chambers air, so that the motor will operate. Because of the above reason, a small number of rotations is sufficient for the operational starting of the motor with the help of the starter.

(b) Because of the method of ignition with the transmitted flame, the combustion takes place within the combustion chambers, independently of the compression degree.

After the above, it is sufficient to increase or decrease the quantity of the distributed fuel toward the distributor "units", as to produce increase or decrease of the rotational speed of the motor. The stabilization condition, i.e. the motor rotations for a certain supply of fuel, is dependent upon the structural elements of the centrifugal compressor, blades 51, combustion chambers inclination, their blades at their openings and the like.

At the slow rotational speeds of the motor the combustion will take place with increased excess of air within the combustion chambers, which is especially valuable for the rapid changes of the lifting force. These changes concern mainly the phases of landing and taking-off or swinging in a short height where there is a demand for rapid change of the lifting force without expecting a slow change of the motor rotations. In these cases, increase or decrease of the distributed fuel quantity is sufficient to result in combustion gases with lower or higher speed of expulsion out of the nozzles. This means an increase or decrease of the lifting force by reaction before a possible corresponding change of the motor rotations (and of the rotated with its blades 51).

INDUSTRIAL APPLICATIONS OF THE MOTOR

Except for those cases where the motor changes the fuel's energy into moving force, there are also very significant applications where the described motor operates like a burner, like an engine of chemical changes, and like an engine of separation of chemical compounds.

As a burner, the motor converts the fuel's energy into thermal energy. The advantages of this application is the creation of very high temperatures on the one hand and, on the the other hand the possibility of combustion and utilization of the fuels of low grade and of the waste products in combination with the low cost of investment, easy rejection of the ash, little pollution of the environment and the like.

As an engine of chemical changes, the motor uses the fuel's energy with the purpose of creation of chemical compounds, splitting of others or both of them. For example, it can convert solid fuels into a mixture of gaseous fuels. Moreover, it can be used for the splitting of chemical compounds in the cases where up to the present electrolysis takes place (consumption of expensive electrical energy).

As an engine of separation of complicated chemical compounds, it expends a low fuel's energy (which may be the chemical compounds themselves) with the purpose of splitting of the chemical compound blends (e.g. coals), so that each one of them can be isolated separately and properly used.

After the above, two questions then arise. The first one is why the described motor is proper for the above application. The second one is why these applications are considered more effective and advantageous than the presently used methods.

Figure 22:
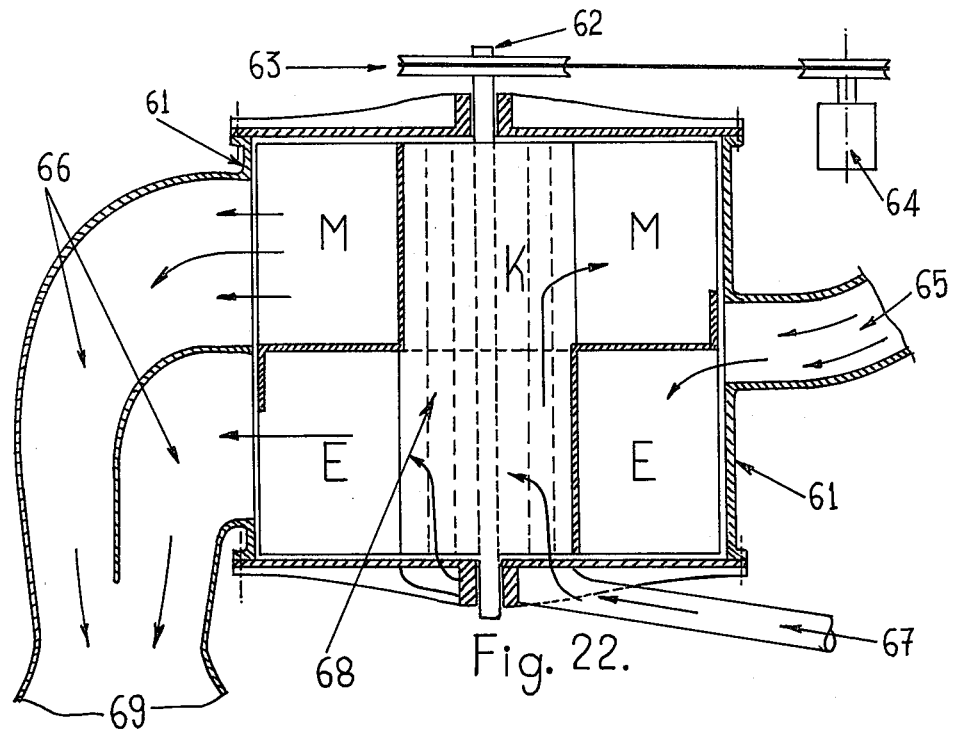
FIG. 22 is a vertical sectional view of a cylindrical engine for industrial uses wherein the openings to the combustion chambers and the distributor are located on cylindrical surfaces.

The answer in the first question is based on the following properties of the motor:

(1) Simplicity of its construction in the fact that there are no valves, springs, pistons and the generally related components. So, the movement of any material within the motor chambers is permitted without danger of obstruction or damage. It is also to be borne in mind that there are no lubricating materials withhin the combustion chambers and distributor which might create problems because their fouling during the above application. In FIG. 22 a form of the described motor is illustrated. It is a cylindrical motor which means that the combustion chamber openings and distributor are located on cylindrical surfaces. There can be seen the chambers M, K and E, as above, which are rotated into a fixed casing 61 which simultaneously is the motor distributor. The rotation of the chambers is carried out with the help of a shaft 62 and pulley 63 which may be rotated by a small electromotor 64.

(2) The air or oxygen which is needed for the combustions is neither sucked from the combustion chambers nor compressed within them. It may be fed with the desired pressure from external compressors. This permits the proper supply for the combustion rotations of the motor and its performance for the purpose that it is intended according to the materials which are fed to its chambers. In FIG. 22 a conductor or duct 65 is seen through which the combustion chambers are fed with air or oxygen. The fuel or a chemical compound in powder condition can be dispersed or split in this air. This chemical compound is only in the case where the motor is not used as a burner but as an engine of splitting of the chemical compound or its reaction with other rudiments, etc.

(3) In these applications, one does not expect from the motor performance of a profitable mechanical task and its autorotation is not necessary. It can be rotated by an external electromotor 64 of a small power while, simultaneously, the expected reaction occurs within its combustion chambers.

(4) The temperatures which can be developed within the combustion chamber can be as high as desired. High temperatures are achieved even with fuels of low heating value, firstly for the air feeding under pressure and after its preheating and, secondly, by enriching the air with oxygen, i.e. by partial rejection of the nitrogen quantity which, because of its high proportion in air, prevents development of high temperatures.

(5) Because of the high temperatures which are developed within the closed combustion chambers and because of the ignition method by the transmitted flame, there will be the following:
 (a) During the transmission of the flame within the closed combustion chamber (overheated and under pressure combustion gases) the result will be a very strong heating on the one hand and, on the other hand compression and strong turbulence of the mixture which is within the combustion chamber. This means rapid and complete combustion of fuels with small thermal power and big ash content.
 (b) In combination with the combustion, there can be splitting of most chemical compounds or blends of them which are supplied with the air (or oxygen) through the conductor 65.
 (c) The pulverization to a high degree of the fuels of low grade is not necessary nor of the waste products or of the chemical compounds. It is sufficient that they are supplied in small particle size so that their proportions be controlled.
 (d) Because of attaining a high speed of combustion, the motor rotations can be increased to produce very big thermal power or productivity (as it concerns the chemical compounds) from its small volume.

(6) Because of the constant volume combustion, great pressure is developed within the chambers such that the combustion products are expelled outwardly by themselves from the chambers. In FIG. 22 are seen the distributor nozzles 66 within which the combustion products of the chambers M, K and E are expanded periodically.

(7) The high temperatures of the combustion and of the combustion gases do not create problems of thermal stresses of the motor because of the periodic operation of the combustion chambers and distributor on the one hand and, on the other hand because of their good cooling. In FIG. 22 is shown a conductor 67 through which the cooling agent is distributed. It fills the cyndrical space 68 where it cools externally the combustion chambers M, E, and K and, after that, it is periodically distributed to the distributor zones and nozzles 66 which it cools after their assault by the overheated combustion gases. The cooling agent is mixed with the combustion products in the common exit of the nozzles 69. However, in the cases of burners air is used as a cooling agent. In other applications, e.g. production of gaseous fuels or splitting or breaking down of chemical compounds, etc, one can use a proper material as a cooling agent, e.g. discharged water which becomes water vapor. In the common exit 69 where the combustion products and cooling agent are distributed, the proper separation can take place by cooling or centrifugation or using electrostatic methods.

In the case of incandescence of coal powder within the combustion chambers, and because of its subsequent expulsion to the atmosphere of water vapor, CO and $H_2$ can be produced. This process is opposite to that kept up to here where the steam is periodically blown into the mass of incandescent coal.

In relation with the second question, regarding why the application of the disclosed motor is more advantageous than presently known methods, several matters must be considered. In all of the above-described cases such as the combustion of fuels of low grade and waste products or the creaction of chemical compounds, the known methods utilize an open combustion chamber, a space to which the fuels are continuously fed with mechanical devices so as to be burned with the distributed air while the resulting combustion gases and the fuel ash are continuously removed from this space. In this motor there is a closed fireplace or chamber, namely, the motor combustion chambers within which certain quantities of air and fuel are isolated and periodically burned.

The closed fireplace has advantages with respect to the open one which will next be described.
 (a) High combustion temperatures can be developed and consequently the time that the fuel needs to be burned can be decreased. It is thus possible to have production of very large quantities of combustion gases of high temperature from a small volume of the motor. Thus, the combustion space has been decreased with large economic advantages. In the case of chemical reactions or splitting of chemical compounds etc., big productive ability results from a motor of small size. On the contrary, in the case of the open fireplace, the temperatures are mediate and the combustion is slow, because if it is desired to inensify the combustion, the air efflux will carry away and disturb the fuels of the fireplace so that the combustion becomes less efficient. The fuels and the carbon monoxide which is necessary for combustion will be carried away and lost with the air.
 (b) With the closed combustion chambers of the motor, there can be air or oxygen under pressure, i.e. at higher temperatures of combustion. This is not possible in the case of the open fireplace.
 (c) In case of closed chambers, one can determine exactly the air and fuel quantity necessary to have complete combustion. This is not possible in the open fireplace where there are zones of poor combustion.
 (d) The exhausted motor combustion gases have very high temperatures. Their mixing with the air which cools the motor permits easy regulation of the temperature at whatever desireable level on the one hand and, on the other hand produces a uniform heating of the heating surfaces of the installation. In the case of the open fireplace there is always some irregularity of heating and the heating regulation is difficult.

(e) In the case of closed fireplaces, high speeds of the combustion gases efflux can be attained because of their expulsion under pressure. As a result, high termal conductivity is attained which involves decrease of the heating surfaces and the volume of the boiler.

(f) The combustion gases and the ash are exhausted out of the motor after complete combustion of the fuel. This facilitates removal of the ash. On the contrary, in the open fireplace, complicated structures and controls are needed so that the unburned fuel is not removed with the ash or the concentration of the ash does not prevent the regular combustion of the fuel.

Figure 23:
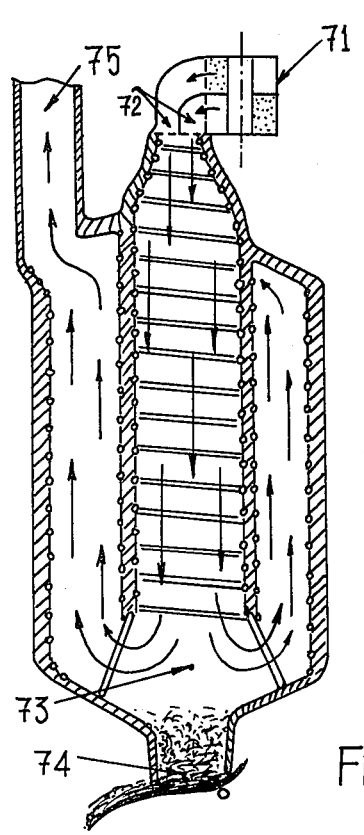
FIG. 23 is a vertical sectional view of one arrangement for locating an engine according to the present invention in a largesize boiler.
Figure 24:
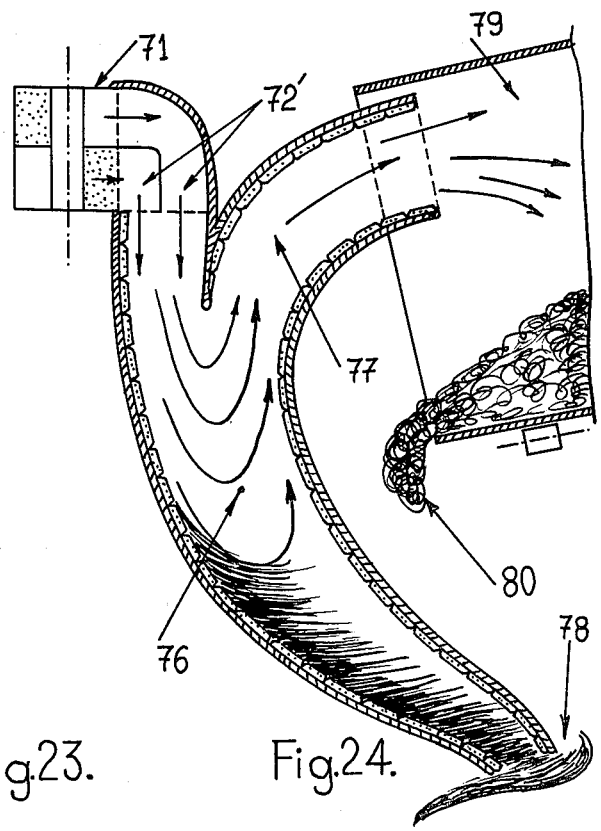
FIG. 24 is a view similar to that of FIG. 23 but showing an arrangement of a motor with a rotary kiln.

In FIGS. 23 and 24 the motor 71 exhausts its combustion gases with the ash downwardly through the nozzles 72. The downward course of the combustion gases permits keeping the ash at a lower region 73, which as soon as it is a little concentrated comes automatically toward the exit by a system of balance 74. The combustion gases from the region 73 continue their upward course within the boiler until their arrival at the chimney 75.

In FIG. 24 the motor 71 exhausts the combustion gases with the ash through its nozzles 72' which follow a curved path within the thermally isolated chamber 76. The combustion gases must undergo a change of course within the chamber 76 toward the conduit 77 while the centrifugated ash goes to its exit 78. From the conduit 77 the combustion gases enter to the rotating kiln 79 under whatever high temperature that is desired. The chamber 76 is not complete vertical but has an inclination to the right or left so that the exit and control of the discharging products 80 from the kiln is facilitated. This system is particularly good in those cases where the ash creates problems in the heating surfaces or in the thermally treated products.

It will be understood that this invention is susceptible to modification in order to adapt it to different usages and conditions and, accordingly, it is desired to comprehend such modifications within this invention as may fall within the scope of the appended claims.

What is claimed is:

1. In an internal combustion engine, the combination of a plurality first, second and relation combustion chambers, said combustion chambers being annularly disposed and arranged in groups and said groups being staggered radially so that the groups lie in two successive arcs offset from one another there being a plurality of successive first chambers defining a first group and a plurality of successive second chambers defining a second group, each of said combustion chambers having an opening and all of said openings defining a single plane, each of said relation chambers overlapping the end ones of a successive pair of first and second groups of chambers to interconnect successive groups so as to transmit combustion gases from one group to another, means for supplying a fuel-air mixture to said combustion chambers, a distributor relatively rotatable to said combustion chambers and having a surface conforming to the plane defined by said chamber openings and closely spaced therefrom, said distributor having a plurality of zones corresponding to the staggered positions of said groups of combustion chambers, there being a plurality of slots and openings in both said zones coregistering with said combustion chamber openings so that upon relative rotation of said combustion chambers and said distributor heated and pressurized combustion gases from a constant volume combustion are transmitted from one chamber to a succeeding chamber to provide continuous ignition of fuel-air mixture within the chambers while exhausting the products of combustion from the chambers whereby a periodic operation and cooling of the two zones of the distributor occurs.

2. In an internal combustion engine as claimed in claim 1 wherein said distributor comprises a flat annular member.

3. In an internal combustion engine as claimed in claim 1 wherein said distributor has means on said openings for guiding exhausted combustion gases whereby a propulsion force is derived.

4. In an internal combustion engine as claimed in claim 1 and further comprising a pair of planar elements defining bonnets each disposed on opposite sides of a said relation chamber and aligned with the respective staggered groups of chambers interconnected by the said relation chamber, said bonnets being in the same surface defined by said chamber opening.

5. An internal combustion engine as claimed in claim 1 in which the chambers include air inlet valves of a non-return type disposed to permit air to enter but prevent gas from leaving the chambers.

6. An internal combustion engine as claimed in claim 1 in which each group of combustion chambers is divided into several separate sections, the sections of one group alternating with the sections of the other group.

7. An internal combustion engine as claimed in claim 1 in which each combustion chamber has a second opening arranged for entry of air and means for periodically opening and closing said second openings to admit air to the chambers.

* * * * *